United States Patent
Fischer et al.

(10) Patent No.: US 7,236,841 B2
(45) Date of Patent: *Jun. 26, 2007

(54) METHOD FOR FAST MANUFACTURING AND ASSEMBLING OF HOT RUNNER SYSTEMS

(75) Inventors: Jonathon Fischer, Oakville (CA); Denis Babin, Georgetown (CA)

(73) Assignee: Mold Masters Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,017

(22) Filed: Nov. 21, 2003

(65) Prior Publication Data
US 2004/0158340 A1 Aug. 12, 2004

Related U.S. Application Data

(63) Continuation of application No. 09/595,154, filed on Jun. 16, 2000, now Pat. No. 6,675,055, and a continuation of application No. 09/595,133, filed on Jun. 16, 2000.

(51) Int. Cl.
*G06F 19/00* (2006.01)

(52) U.S. Cl. .......................... 700/98; 700/210; 700/18; 264/297.2

(58) Field of Classification Search .................. 700/97, 700/96, 100, 67, 18, 180, 200, 210; 264/297.2, 264/297.3; 235/472.01, 462.01, 375, 380
See application file for complete search history.

(56) References Cited

U.S. PATENT DOCUMENTS 2,871,886 A 2/1959 Obreski et al.
3,095,604 A 7/1963 Ackaret 4,422,841 A 12/1983 Alfonsi et al.
(Continued)

FOREIGN PATENT DOCUMENTS

DE   4324027 A1   1/1995

(Continued)

OTHER PUBLICATIONS hppt://www.bigmachine.com, product configurator; 1999.*

(Continued)

*Primary Examiner*—Kidest Bahta
(74) *Attorney, Agent, or Firm*—McDonnell Boehnen Hulbert & Berghoff LLP

(57) ABSTRACT

The method and apparatus of the present invention includes a computer implemented injection molding configuring subsystem which enables a customer to interactively specify and design a system using a mix of parameters that the customer specifies and are manufacturing process determined. The configuring subsystem is connected to a computer network such as the Internet. The method and apparatus of the present invention further includes a computerized business and processing subsystem in communication with the configuring subsystem. The computerized business subsystem automatically provides a cost and schedule for a system configured by the configuring subsystem and additionally processes an order for the system.

U.S. PATENT DOCUMENTS

The processing subsystem automatically processes the customer's inputs and generates drawings for the configured system. Prior to receiving the customer's order, hot runner system components may be partially manufactured in a first phase and placed in inventory. The partially manufactured hot runner components may then be removed from inventory after receiving a customer's order, and further manufactured and assembled in accordance with the customer's parameters in a second phase.

16 Claims, 44 Drawing Sheets

| | | |
|---|---|---|
| 4,439,915 A | 4/1984 | Gellert |
| 4,579,520 A | 4/1986 | Gellert |
| 4,381,685 A | 5/1986 | Brooks |
| 4,609,138 A | 9/1986 | Harrison |
| 4,638,546 A | 1/1987 | Benshoof |
| 4,648,546 A | 3/1987 | Gellert |
| 4,663,811 A | 5/1987 | Gellert |
| 4,688,622 A | 8/1987 | Gellert |
| 4,761,343 A | 8/1988 | Gellert |
| 4,799,156 A | 1/1989 | Shavit et al. |
| 5,007,821 A * | 4/1991 | Schmidt ............. 425/548 |
| 5,030,084 A | 7/1991 | Gellert et al. |
| 5,103,421 A * | 4/1992 | Ward et al. ............ 707/3 |
| 5,227,179 A | 7/1993 | Benenati |
| 5,311,424 A | 5/1994 | Mukherjee et al. |
| 5,352,109 A | 10/1994 | Benenati |
| 5,366,369 A | 11/1994 | Gellert |
| 5,392,502 A | 2/1995 | Freer |
| 5,421,716 A | 6/1995 | Gellert |
| 5,441,197 A | 8/1995 | Gellert et al. |
| 5,444,844 A | 8/1995 | Inoue et al. |
| 5,463,555 A | 10/1995 | Ward et al. |
| 5,496,168 A | 3/1996 | Renwick |
| 5,508,909 A | 4/1996 | Maxwell et al. |
| 5,518,389 A | 5/1996 | Nonomura et al. |
| 5,536,164 A | 7/1996 | Brun, Jr. et al. |
| 5,539,650 A | 7/1996 | Hehl |
| 5,639,489 A | 6/1997 | Van Boekel |
| 5,645,867 A | 7/1997 | Crank et al. |
| 5,658,604 A | 8/1997 | Gellert et al. |
| 5,705,202 A | 1/1998 | Gellert |
| 5,707,664 A | 1/1998 | Mak |
| 5,738,149 A | 4/1998 | Brun, Jr. et al. |
| 5,762,976 A | 6/1998 | Brown |
| 5,765,137 A | 6/1998 | Lee |
| 5,792,493 A | 8/1998 | Gellert |
| 5,802,497 A | 9/1998 | Manasse |
| 5,805,442 A | 9/1998 | Crater et al. |
| 5,812,402 A | 9/1998 | Nishiyama et al. |
| 5,839,117 A | 11/1998 | Cameron et al. |
| 5,847,957 A | 12/1998 | Cohen et al. |
| 5,849,343 A | 12/1998 | Gellert et al. |
| 5,857,201 A | 1/1999 | Wright, Jr. et al. |
| 5,870,719 A | 2/1999 | Maritzen et al. |
| 5,890,402 A | 4/1999 | Nedbal |
| 5,894,571 A | 4/1999 | O'Connor |
| 5,895,454 A | 4/1999 | Harrington |
| 5,952,016 A | 9/1999 | Gellert |
| 5,960,411 A | 9/1999 | Hartman et al. |
| 5,970,475 A | 10/1999 | Barnes et al. |
| 5,991,739 A | 11/1999 | Cupps et al. |
| 5,995,757 A | 11/1999 | Amberg et al. |
| 6,007,108 A | 12/1999 | Braun |
| 6,038,668 A | 3/2000 | Chipman et al. |
| 6,061,603 A | 5/2000 | Papadopoulos et al. |
| 6,092,000 A | 7/2000 | Kuo et al. |
| 6,167,383 A | 12/2000 | Henson |
| 6,173,210 B1 * | 1/2001 | Bjornson et al. ............. 700/99 |
| 6,182,897 B1 * | 2/2001 | Knowles et al. ....... 235/462.01 |
| 6,230,384 B1 | 5/2001 | Gellert |
| 6,095,790 A1 | 8/2001 | Gellert |
| 6,292,894 B1 | 9/2001 | Chipman et al. |
| 6,341,271 B1 * | 1/2002 | Salvo et al. ................. 705/28 |
| 2002/0091923 A1 | 7/2002 | Chipman et al. |

FOREIGN PATENT DOCUMENTS

| | | |
|---|---|---|
| DE | 197 30 179 C1 | 10/1998 |
| EP | 0162412 A3 | 11/1985 |
| EP | 0162412 A2 | 11/1985 |
| EP | 0 225 514 | 6/1987 |
| EP | 0 262 490 A1 | 4/1988 |
| EP | 0 314 595 A2 | 5/1989 |
| EP | 0 425 981 A2 | 5/1991 |
| EP | 0801355 A2 | 10/1997 |
| EP | 0 875 355 A1 | 11/1998 |
| EP | 0 950 494 | 10/1999 |
| GB | 2 325 996 A | 12/1998 |
| WO | WO 95/00312 | 1/1995 |
| WO | WO98/52144 | 5/1998 |
| WO | WO 99/20451 | 4/1999 |
| WO | WO 1999/045488 A | 9/1999 |
| WO | WO 02/10993 A2 | 2/2002 |
| WO | WO 02/010993 A3 | 2/2002 |

OTHER PUBLICATIONS

German Office Action, filed Jan. 25, 2006, Germany.

Joseph Ogando, "Tooling Close–Up: Get Custom Hot Halves in a Hurry". Plastics Technology Online, Sep. 1999. www.plasticstechnology.com/articles/199909cu1.html.

Press Release from Husky Injection Molding Systems Ltd., "Pronto expanded to 8–drop hot runner systems", Jan. 31, 2001, www.husky.ca/en/news_release_printable/2001-01-31.html.

Husky Brochure, "Pronto™ SP–SERIES Hot Runner System" Jun. 2000.

Husky Brochure, "Pronto™ Complete Hot Runner Systems—4–Week Delivery", Jun. 2000.

Plastics Auxiliaries, "Product News –Hot Runner News: Fast Systems and New Nozzle Tip/Insulator", at http://www.plasticsauxiliaries.com/product_news/dec99/product_news6.htm, Dec. 1999.

Dynisco HotRunners, "Express Products –Reliable and Customized Hot Runner Solutions with Fast Delivery", Sep. 15, 1999.

Dynisco HotRunners, "HotRunners –Dynisco HotRunner Express Series", at http://www.dynisco.com/hotrun/products/hotrun_expressseries.stm, Sep. 15, 1999.

National Tool and Mold Manufacturing Co., "Mold Sets", "Angle Pins", and "Shopping Cart", at http://www.ntm.com/mold_set.asp?series=A&nav=online, Feb. 24, 2000.

Mold–Masters Brochure, "Master Speed,"Jun. 23, 2003.

Mold–Masters Brochure, "MIM Speed Program," Aug. 1, 2000.

Mold–Masters Brochure, "MIM Speed Program," Oct. 1, 2001.

Mold–Masters Brochure, "DURA Hot Runner Systems," Jun. 1, 2002.

Mold–Masters Brochure, "Master Speed," 2003.

Mold–Masters Brochure, "Packaging Hot Runner Solutions," Jun. 23, 2003.

Mold–Masters Brochure, "Medical Hot Runner Solutions," Jun. 23, 2003.

Mold–Masters Brochure, "Automotive Hot Runner Solutions," Jun. 23, 2003,.

Mold–Masters Brochure, "Housewares Hot Runner Solutions," Jun. 23, 2003.

Mold–Masters Brochure, "Teletronics Hot Runner Solutions,"Jun. 23, 2003.

Mastip Technolog Ltd, "Technical Information)", pp. 1–5, 1999.

Mastrip Technolog Ltd, "MT Nozzle Series)", pp. 1–5, 1999.

Eurotool, "Navigator", Interactive Hot Runner System Selection, Dos V 1.7.

Roller, D. Schafer, D.: Parametrische Modellierung –Situationsanalyse und Trends; in: CAD/CAM, No. 5, 1998, pp. 96–104, (Translation submitted).

Gausemeier, J. et al., Produktentwicklung im weltweiten Netzwerk; in: ZWK 91, No. 7–8, pp. 323–325, (Translation submitted);.

Proc. Of the $3^{rd}$ Int. Conf. Computer Integrated Manufacturing; vol. 1, 1995, pp. 29–36, 82–89, 143–150 and 295–310.

International Search Report dated Dec. 5, 2001, for PCT/IB 01/01052.

International Search Report dated Jun. 12, 2003, for PCT/IB 01/01072.

Mold–Masters Hot Runner Technology Newsletter—Injectioneering, 1999.

Mold Plus—A Software Technology from Mold–Masters, 1997.

Mold–Masters—We're Introducing a Wizard to Make Hot Runner Design Quicker and Easier, 1999.

Snyder, Merle, Dynisco HotRunners—Automation Yields Fast Hot–Runner Deliveries, Modern Plastics, Jul., 2000.

Dynisco HotRunners—New Product Showcase—Manifolds Standardized, Yet Variable, Injection Molding, May 1999.

* cited by examiner

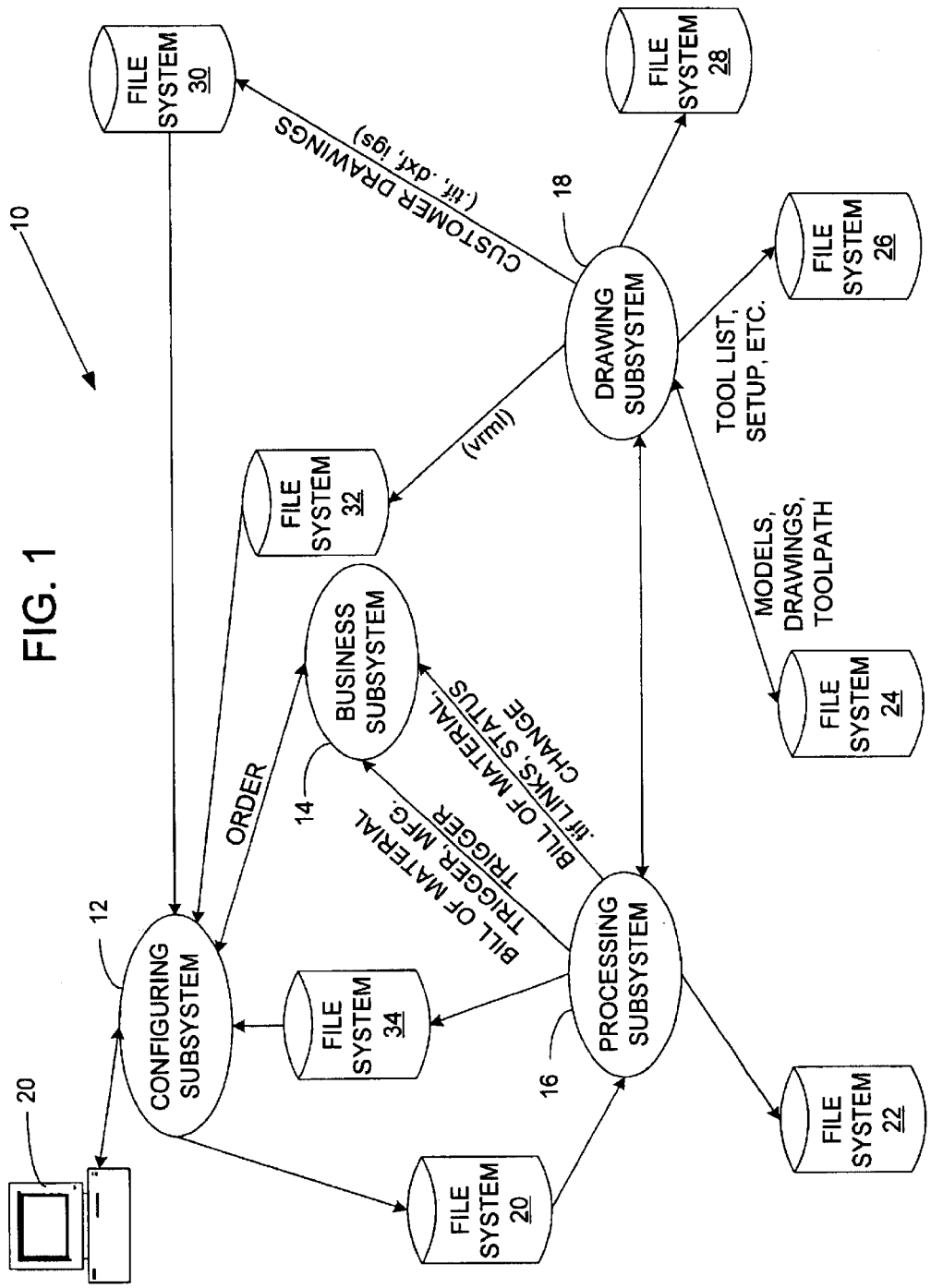

*MERLIN™ Configurator*

MOLD-MASTERS

▸ *Merlin™ Home*  ▸ *Merlin™ Support*

Sub Manifold Pitch Selection
Click HERE for more detailed information

[ Previous Step ]

Click the Next button to accept this dimension or enter a smaller pitch dimension for your application if required.

Off Pitch X: [190]  [mm ▼]

[ Next ]   342

Relevant Catalog Pages

| Catalog Page | Title | Revision Date | CAD Drawings |
|---|---|---|---|
| [View] | M8.01.05 Mim Dura Hecto Valve nozzle L=120 | Jun 6 2000 12:41AM | [Download] |
| [View] | M8.01.05 MDH C VALVE TS0664 + TSL229 | Jun 6 2000 12:41AM | [Download] |
| [View] | M8.01.05 MIM Dura Hecto-Shot ® Bi-Metallic C-Valve | Jun 6 2000 12:41AM | [Download] |

FIG. 18

MERLIN™ Configurator

» Merlin™ Home  » Merlin™ Support

MOLD - MASTERS

MIM Dura Hecto-Shot ® Bi-Metallic C-Valve

Location Ring
Please select the locating ring you require, or click HERE for more information.

[Previous Step]

| Matches | Locating Ring # | Description | Diameter (mm) |
|---|---|---|---|
| 1 | LR0070 | Loc. ring for machine nozzle pad | 101.34 |
| 2 | LR0071 | Loc. ring for machine nozzle pad | 109.75 |
| 3 | LR0081 | Locating Ring for Valve system with BP58, inch | 101.36 |
| 4 | LR0082 | Locating Ring for Valve system with BP58, metric | 109.77 |
| 5 | LR0086 | Locating Ring for Sprue system with BP58, inch | 101.36 |
| 6 | LR0087 | Locating Ring for Sprue system with BP58, metric | 109.77 |

☐ Gate Seal  ☐ Water Cooled Gate Insert  ☐ Locating Ring
☐ Nozzle  ☐ Valve Actuator  ☐ Manifold Plates
☐ Manifold  ☐ Inlet Component

Relevant Catalog Pages

| Catalog Page | Title | Revision Date | CAD Drawings |
|---|---|---|---|
| [View] 10.01.11 | Manifold center heater | 98-Oct-22 | [Download] |
| [View] 12.01.12 | Hydraulic/Pneumatic Cylinder Assembly | 98-Oct-22 | [Download] |
| [View] M8.02.02 | 2-Inline Sub Manifold | Jun | [Download] |
| [View] M8.01.05 | Mim Dura Hecto Valve nozzle L=120 | Jun 6 2000 12:41 AM | [Download] |
| [View] M8.01.05 | MDH C VALVE TS0664 + TSL229 | Jun 6 2000 12:41 AM | [Download] |
| [View] M8.01.05 | MIM Dura Hecto-Shot ® Bi-Metallic C-Valve | Jun 6 2000 12:41 AM | [Download] |

MERLIN™ Configurator

M O L D - M A S T E R S

▸ Merlin™ Home   ▸ Merlin™ Support

Summary Information Form

Please fill in the relevant information and check for correctness.

[ Previous Step ]   [ View Printable Version ]

Action To Be Taken. For more information click HERE

| Step 1 — 582 | Step 2 — 584 | Step 3 — 586 | Step 4 — 588 |
|---|---|---|---|
| [ Save ] | [ Quote ] | [ Review ] | [ Order ] |

Lead Time: No Lead Time Available.

Quote #: 0040003107

Price: $6,681.00 USD

Not Reviewed.

Order #:

PO #
[ N/A ]

[ Generate Drawings ]    590

Company Name:                    Contact Name:

Mold Maker:            Molder:            End User:

Customer Ref. # :           Requested Delivery Date:

Plastic Part # :    Plastic Part Name:    Industry Segment:

Required Parts List

| Part Number | Description | Options |
|---|---|---|
| TS0664P2 | MDH C VALVE TS0664 + TSL229 | N/A |
| NZMH1B1A120P | Mim Dura Hecto Valve nozzle L=120 | N/A |
| MNMDH21200BL4VP | 2-Inline Sub Manifold | N/A |
| HY6600D | Hydraulic/Pneumatic Cylinder Assembly | N/A |
| BP58.750P | Manifold center heater | N/A |
| LR0081 | Locating Ring for Valve system with BP58, inch | N/A |

Additional Information

| Material | Part | Mold | Other |
|---|---|---|---|
| Material type : Acrylonitrile Butadiene Styr. | Shot Weight : 500 - 3500g | # of Cavities : | Gate Cosmetics : |
| Grade: | Est. Injection Time (sec.): | Sub-runners: | Gate Cooling: |
| Supplier: | Wall Thickness: | Gate: | Dim. Stability: |

Generated Drawings
Choose any of the file options below to download or view online

| Type | Drawings | Options |
|------|----------|---------|
| TIF | GT_sys_valve_config_HY6600_0077.tif (1449539 Bytes) | [Download] 602 [View] 604 |
| TIF | GT_sys_valve_config_SYSTEM_ASSEMBLY_.tif (1170968 Bytes) | [Download] [View] |
| DXF | GT_sys_valve_config_HY6600_0077.dxf (1095118 Bytes) | [Download] [View] |
| DXF | GT_sys_valve_config_SYSTEM_ASSEMBLY.dxf (1786603 Bytes) | [Download] [View] |
| IGS | GT_sys_valve_config_HY6600_0077.igs (2487962 Bytes) | [Download] [View] |
| IGS | GT_sys_valve_config_SYSTEM_ASSEMBLY.igs (2302724 Bytes) | [Download] [View] |
| WRL | GeneralAssembly.wrl (2461551 Bytes) | [Download] [View] |

FIG. 31

MERLIN™ Configurator

▸ Merlin™ Home   ▸ Merlin™ Support

M O L D - M A S T E R S

Existing Configurations
Please Make a selection. For detailed information concerning your possible choices click HERE

| Action | | | Configuration Name | Quote # | Order # | Date/Time | Status |
|---|---|---|---|---|---|---|---|
| Load | Copy | Delete | Previous Config | 0040003107 | | 6/12/00 2:39:47 PM | |
| Load | Copy | Delete | SAP Test | 0040003098 | | 6/9/00 11:31:20 AM | |
| Load | Copy | Delete | 2 drop hect 190 pitch | 0040003093 | | 6/8/00 1:53:36 PM | |

FIG. 34

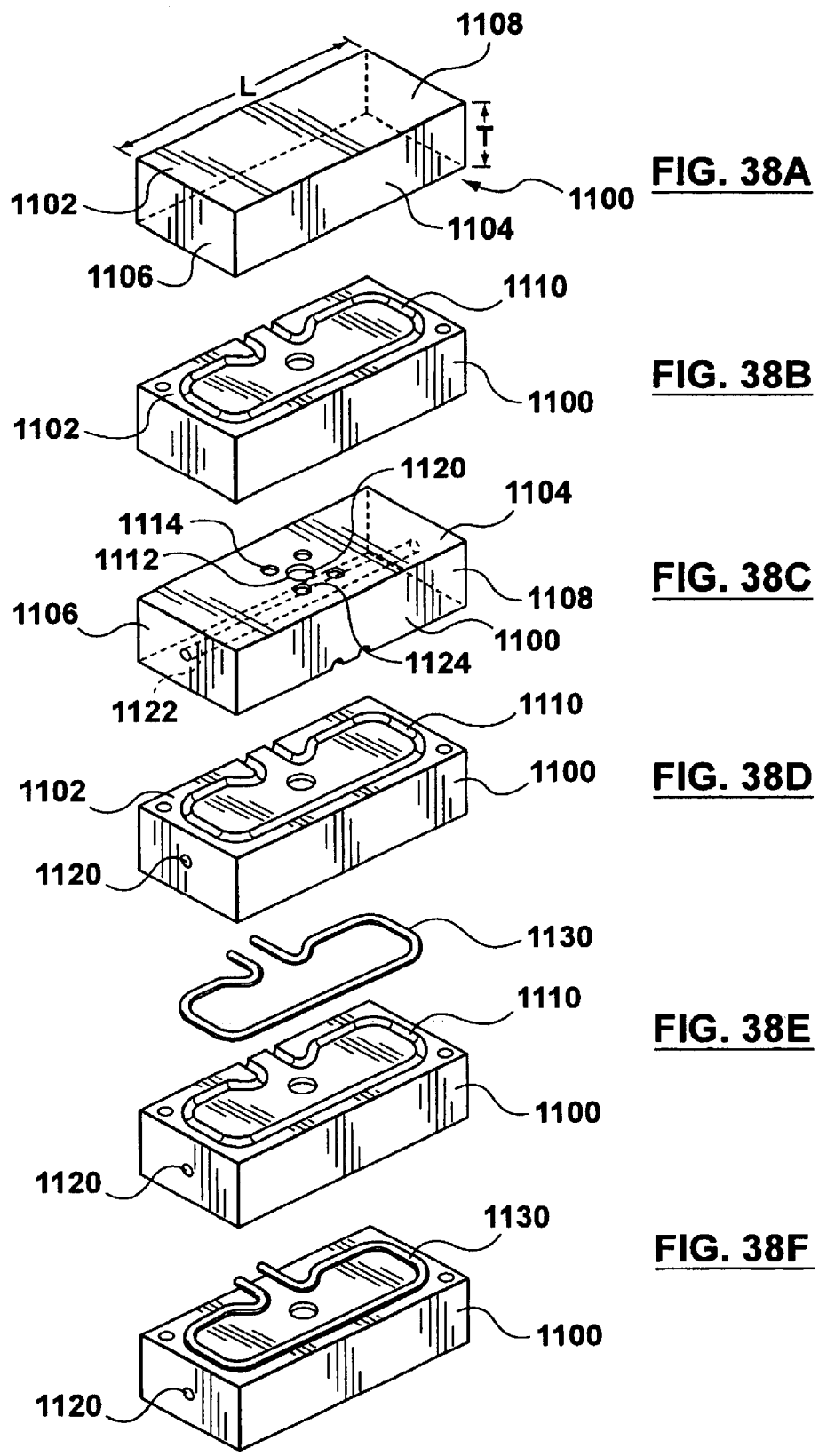

METHOD FOR FAST MANUFACTURING AND ASSEMBLING OF HOT RUNNER SYSTEMS

CROSS REFERENCE TO RELATED APPLICATIONS

This application is a continuation of prior application Ser. No. 09/595,154, filed Jun. 16, 2000, now U.S. Pat. No. 6,675,055 entitled "Method and Apparatus for an Automated Injection Molding Configuring and Manufacturing System," and specifically incorporated by reference herein in its entirety. This application is also a continuation of prior application Ser. No. 09/595,133, filed Jun. 16, 2000, entitled "Method for Fast Manufacturing and Assembling of Hot Runner Systems," and specifically incorporated by reference herein in its entirety.

FIELD OF THE INVENTION

This present invention relates to injection molding systems. More specifically, it relates to a method and apparatus for an automated injection molding configuring and manufacturing system.

The present invention also relates to a method for fast manufacturing and assembling of hot runner systems. More specifically, it relates to a method of manufacturing and assembling customized hot runner systems using a wide selection of standard manifold plates, nozzles, and other stock components.

BACKGROUND OF THE INVENTION

In many manufacturing businesses the time from the initial customer contact to the release of components or systems for production is a critical path. Current processes and tools in place in many manufacturing processes, in particular, injection molding processes cannot support the order volume desired by the manufacturers.

Injection molding is a process by which some malleable material is forced under pressure into a closed mold. The material solidifies and retains the shape of the mold. Thermoplastic materials, thermosetting materials and some ceramic materials can be processed in this way. In a typical injection molding process, a material is melted and injected into a mold that has been clamped shut. The material freezes in the relatively colder mold and is then ejected.

At the beginning of the molding cycle, the molten material is injected into the mold through a sprue bushing, runner, and gate. During injection, the molten material (the "melt") is subject to a cooling effect by contact with the relatively lower temperature surface of the mold, but is also subject to a heating effect due to viscous dissipation in the melt. If the cooling effect is greater than the heating effect, the plastic may solidify before the mold is filled, resulting in an unfilled mold, i.e. a "short shot". If the heating effect dominates, the molding cycle may be unnecessarily extended for added cooling time. Because of the high volume rates of operation, even small gains or losses of time can be significant. The melt temperature and injection rate must be chosen so that neither of these problems occurs.

At the end of the injection period, the flow in the mold stops, the pressure rises rapidly, and the material begins to cool. As the material cools it shrinks slightly and more material may be forced into the cavity to the hold pressure acting on the melt. This portion of the molding cycle is called the "hold" or the "packing stage", and it continues until the hold pressure is released or until the gate freezes. After the gate has frozen, the material in the mold continues to cool, which at first causes a reduction in pressure, followed by shrinkage of the material in the cavity. When the molded part has cooled sufficiently to remain rigid, the mold may be opened and pins eject the molded part, runner, and sprue from the mold.

Over the last decade, the techniques for designing, building, and ordering injection molding processes have been improved to increase productivity. There are systems in place that support electronic versions of catalogs of injection molding components such as, those offered by Mold Masters Limited, the assignee of this invention, Hasco Yudo, Dynisco, Heatlock, Mastip and the National Tool and Manufacturing Co. Further, interactive systems for selection of components from standard component lists such as Eurotool offered by Navigator are known in the art. There are systems also in place that support automatic drawing generation of injection molding systems. Further, there are systems available that integrate a computerized business system with a computerized manufacturing system.

However, even with recent improvements, the current injection molding systems have several drawbacks. Specifically, problem areas include the inadequacy of specification and order systems. For example, such systems are typically confined to only limited off-the-shelf components and information. Further, some systems presently allow the user to specify and order injection molding systems, such as hot runner systems, even though the person ordering has insufficient knowledge or experience to specify the product design. The resulting product may not function or may even result in a safety concern. In addition, current systems still require manual human intervention downstream by the manufacturer's personnel such as, for example, by the engineers. Further, typically the current manufacturing systems include the manual generation of the manufacturing information, such as the tooling information.

Accordingly, it is desirable to automate and integrate the design, specification, configuration and order systems with the business and manufacturing systems to enable a real-time automated configuring and manufacturing system which overcomes the problems associated with the prior art.

Hot runner systems for injection molding are well-known in the art. Hot runner systems generally comprise a manifold plate with a plurality of injection nozzles. The manifold plates used in such hot runner systems come in a variety of different shapes, configurations, and styles, depending on customer and/or manufacturing preferences. For example, the manifold plate may have a straight bar shape, X-shape, H-shape, Y-shape, Y-plate shape, or H-plate shape. In addition, the manifold plate may be configured with a wide range of lengths (e.g., 150 millimeters to 600 millimeters) and thickness (e.g., 25 millimeters to 40 millimeters), and the flow channels of the manifold plate may be configured with a wide range of diameters (e.g., 3 millimeters to 12 millimeters).

The number, pitch spacing, and type of nozzles used with the manifold plate may also vary depending on customer and/or manufacturing preferences. For instance, anywhere from 2 to 8 nozzles (or more) may be used with a manifold plate, and each nozzle may be spaced (i.e., nozzle pitch) anywhere from 30 mm to 250 mm away from the melt inlet of the manifold plate. Moreover, the nozzles may have a number of different shapes, sizes, tips styles, gate configurations (e.g., thermal or valve gating), and shot weight ranges.

Obviously, it would be very impractical and expensive, if not impossible, to pre-manufacture and pre-assemble all of the possible existing combinations of hot runner systems, and have them stored in inventory for delivering to a customer upon placing an order. In contrast, it would be undesirable to unduly limit the shapes, configurations, styles, types, and/or sizes of the manifold plates and nozzles used in hot runners systems, and restrict customers' ability to customize their hot runner systems. Thus, in order to accommodate their various designs and customers' custom specifications, hot runner systems are typically not manufactured or assembled until after customers have placed orders for the hot runner systems and specified their design requirements. Consequently, the manufacturing and assembling of such hot runner systems can take several weeks, if not several months, to complete, since all of the work is done after the customer places an order.

A typical hot runner system is manufactured and assembled with the following prior art method. In the first step, a customer's order is taken by the hot runner maker, including the customer's specifications for the ordered hot runner system. Based on the customer's specifications, the raw material for the manifold is selected in the second step, and the manifold plate is manufactured in the third step by cutting and grinding the raw material into the desired manifold plate dimensions. Next, in the fourth step, a heating element is added to the manifold plate, and in the fifth step, the main and auxiliary flow channels are drilled in the manifold plate. Then, in the sixth step, holes for attachments to the manifold plate are drilled, bored, and/or machined, and the specified injection nozzles are manufactured in the seventh step. Finally, in the eighth step, the specified components, including the injection nozzles, are attached to the manifold plate, and the customized hot runner system is completed and delivered to the customer in the ninth step. As previously mentioned, this prior art method can take several weeks, if not months, to complete.

Accordingly, it would be desirable to provide a method for speeding up the manufacturing and assembling processes involved with hot runner systems to allow customers to receive their hot runner systems in a shorter period of time (i.e., in a matter of days, rather than weeks), yet still provide customers with the flexibility to customize their hot runner systems. The present invention accomplishes this desire and overcomes the problems with the prior art by providing a method for quickly manufacturing and assembling customized hot runner systems using a wide selection of standard manifold plates, nozzles, and other stock components, such as manifold heating elements and plugs. The method of the present invention enables hot runner systems to be rapidly assembled from partially manufactured components, while still allowing customers to choose from a broad range of options for manifold plates and injection nozzles, and to specify the requirements for their hot runner systems.

SUMMARY OF THE INVENTION

The method and apparatus of the present invention includes an automated injection molding configuring and manufacturing system. A configuring subsystem in accordance with the present invention, enables customers to interactively create designs of their specific systems utilizing a web site.

In accordance with a preferred embodiment, the method of the present invention includes, configuring an injection molding system using a mix of customer determined parameters and manufacturer determined parameters. Further, the method includes using an input into the configuring subsystem for the generation of: (i) customer viewable models and drawings, (ii) engineering bill of materials, which may be subsequent input into a business subsystem, (iii) manufacturing drawings, and (iv) the machine tool codes, setups, and required tool lists. In a particular embodiment, the method of the present invention includes a processing subsystem that creates product drawings from the configured design. Further, the method includes verifying the configured design to ensure that the injection molding system specified is functional and safe.

In accordance with another aspect of the present invention, an automated injection molding configuring and manufacturing system includes a configuring subsystem for designing a custom designed injection molding system using a mix of customer defined parameters and manufacturer defined parameters. The system further includes a business subsystem and/or a processing subsystem in communication with the configuring subsystem.

The foregoing and other features and advantages of the method and apparatus for an automated injection molding configuring and manufacturing system will be apparent from the following more particular description of preferred embodiments of the method and apparatus as illustrated in the accompanying drawings.

Moreover, the present invention provides a method for manufacturing and assembling hot runner systems comprising the steps of manufacturing a plurality of manifold plates, injection nozzles, and plugs, and adding heating elements to the manifold plates. The method of the present invention also comprises the steps of drilling flow channels into the manifold plates, and placing the manifold plates, the injection nozzles, and the plugs in stock. The method of the present invention further comprises the steps of taking orders with specifications for hot runner systems, and removing from stock the manifold plates, the injection nozzles, and the plugs that correspond to the specifications of the orders. In addition, the method of the present invention comprises the steps of boring out holes for the plugs in the manifold plates at locations that correspond to the specifications of the orders, inserting the plugs into the bored out holes of the manifold plates, and attaching the nozzles to the manifold plates in alignment with the plugs.

BRIEF DESCRIPTION OF THE DRAWINGS

Preferred embodiments of the present inventions are described with reference to the following drawings, wherein:

FIG. 1 is a diagram illustrating a preferred embodiment of the configuring and manufacturing system in accordance with the present invention;

FIGS. 17 and 18 are illustrations of computer screen displays of the manifold configuration selection process as offered by a particular embodiment of the configuring subsystem in accordance with the present invention;

FIG. 27 is an illustration of a computer screen display of the location ring selection process as offered by a particular embodiment of the configuring subsystem in accordance with the present invention;

FIG. 28 is an illustration of a computer screen display of the molding elevation selection process as offered by a particular embodiment of the configuring subsystem in accordance with the present invention;

FIG. 29 is an illustration of a computer screen display of the customer information form as offered by a particular embodiment of the configuring subsystem in accordance with the present invention;

FIG. 30 is an illustration of a computer screen display of the summary information form as offered by a particular embodiment of the configuring subsystem in accordance with the present invention;

FIG. 31 is an illustration of a computer screen display of the list of generated drawings offered by a particular embodiment of the configuring subsystem in accordance with the present invention;

FIG. 34 is an illustration of a computer screen display of the existing configurations as offered by a particular embodiment of the configuring subsystem in accordance with the present invention;

FIG. 38A-38J are perspective views of a partial straight bar, two nozzle hot runner system that is manufactured and assembled according to the method of FIG. 37.

38J, as well as partial exemplary X-shaped and H-shaped, four nozzle hot runner systems, together with tables for preferable nozzle pitches and manifold dimensions for such hot runner systems.

Figure 38G:
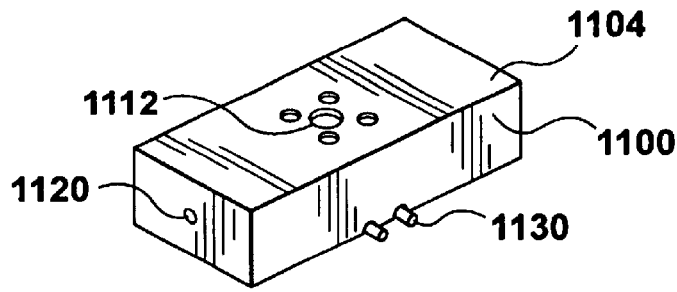
Figure 38H:
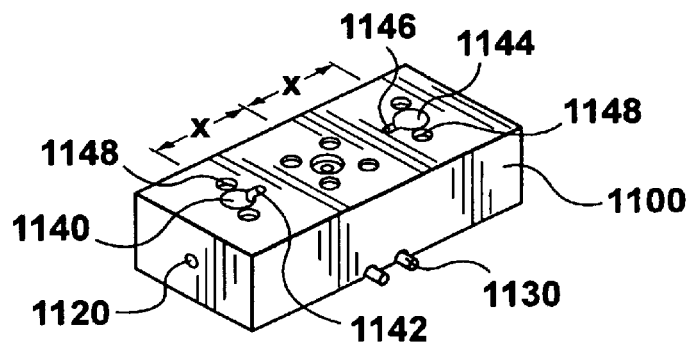
Figure 38I:
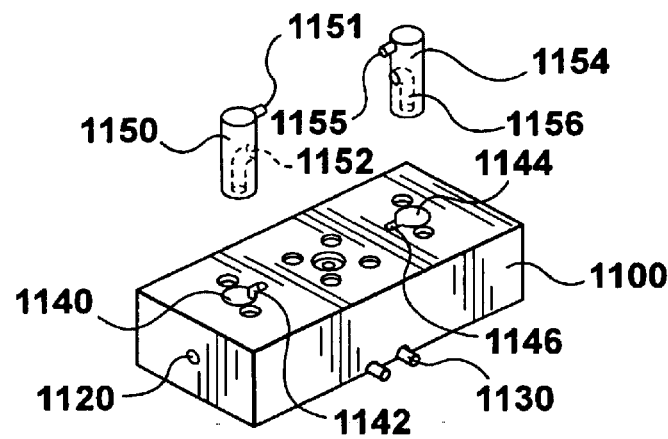
Figure 38J:
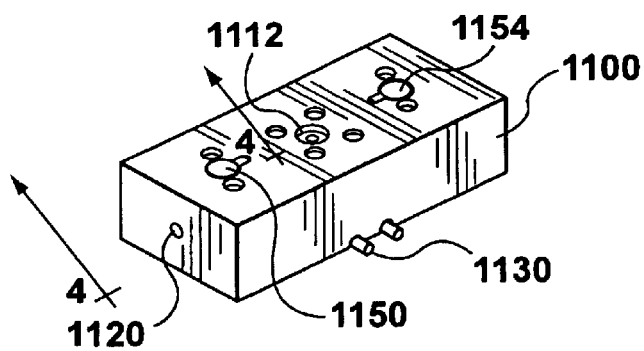
Figure 39:
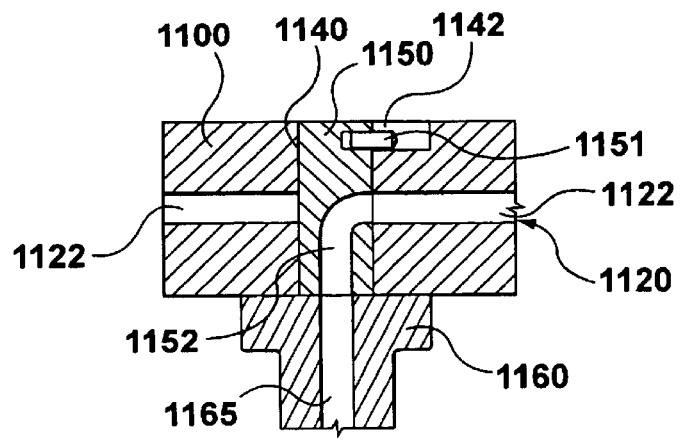

FIG. 39 is a partial cross-sectional view of a plug of the hot runner system of FIG. 38J, taken along line 4—4.

Figure 40:
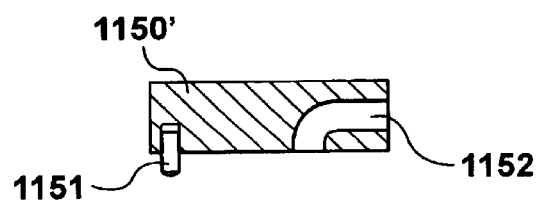

FIG. 40 is a side cross-sectional view of the plug of FIG. 39 rotated into a lateral position and parallel orientation.

Figure 41:
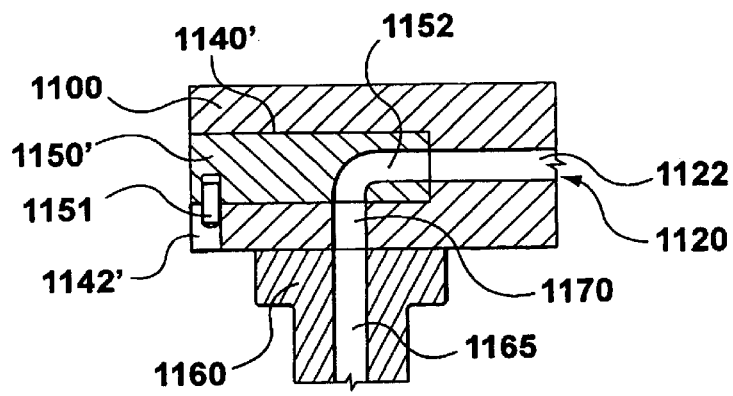

FIG. 41 is a partial side cross-sectional view of the plug of FIG. 40 positioned within a modified bore that has been rotated into a lateral position and parallel orientation corresponding to the plug.

DETAILED DESCRIPTION OF PREFERRED EMBODIMENTS

The present invention is directed to systems and methods for automating and integrating injection molding configuring and manufacturing systems.

The operating environment for the methods and apparatus for the injection molding configuring and manufacturing system of the present invention includes a processing system with at least one high speed processing unit and a memory system. In accordance with common practices in the art of computer programming, the description below includes reference to acts and symbolic representations of operations or instructions that are performed by the processing system, unless indicated otherwise. Such acts and operations or instructions are sometimes referred to as being "computer-executed" or "processing unit executed."

It will be appreciated that the acts and symbolically represented operations or instructions include the manipulation of electrical signals by the computer processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exist exclusively on the processing system or is distributed among multiple interconnected processing systems that may be local or remote to the processing system.

The systems may be implemented using, but not limited to, the software and standards such as, for example, an IDEAS Master Series 7m2 running on Windows NT, SAP 4.6 running on Windows NT 4.0 (service pack 2), Microsoft Visual C++(v5.0), and HTML version 3.0. However, it is possible to use other applications, languages, standards, and/or operating systems such as UNIX, LINUX or others.

FIG. 1 illustrates a preferred embodiment of the system 10 in accordance with the present invention which is used to configure and manufacture injection molding systems. The system 10 includes a configuring subsystem 12 which is a web-based, designing and ordering a configuration subsystem. A customer 20, can use the configuring subsystem 12 which is in communication with a web server using a browser application. The information present in the configuring subsystem 12 includes, but is not limited to, components, such as, locating rings, melt entries, manifolds, center locators, manifold cam locators, nozzle flanges, nozzles, actuators, and valves or pressure disks.

The configuring subsystem 12 receives a variety of inputs from the customer 20. These customer inputs include, but are not limited to, frame length, frame width, frame height, insulator plate, such as, for example, selecting between a "yes" or "no" option regarding the insulator plate, size, mold elevation, clamp slot details, water fitting type and size, leader pin size and position, guide pin size, screw size and position, clearance pockets size and position, mold foot, pry-slot and customer wire schematic and type of connector.

The system 10 includes a business subsystem 14 which processes the various bills and maintains cost and status information from the step of system quotation to the step of delivery of injection molding systems. In one particular embodiment, the business subsystem 14 is typical of a business transaction processing system. An example of the business subsystem 14 is the Enterprise Resource Planning (ERP) system, such as a SAP system.

The system 10 further includes a processing subsystem 16 which is a combination of custom software and general application software packages. It generates drawings based on the customer 20 input into the configuring subsystem 12.

The system 10 further includes a drawing subsystem 18 which generates two and three dimensional customer drawings and models. The drawing subsystem 18 also generates manufacturing tool lists and setup information.

Figure 2A:
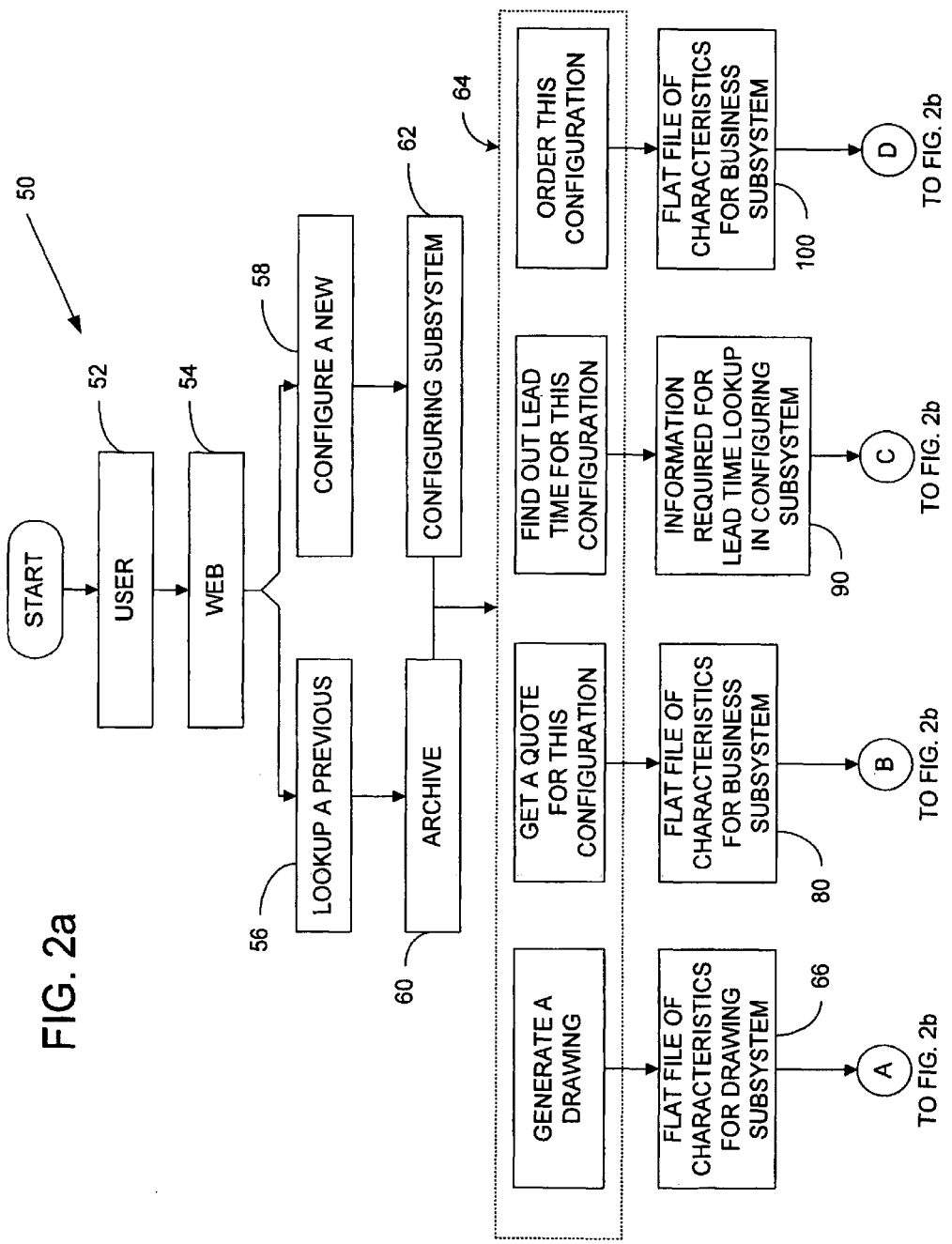
FIGS. 2a and 2b are flowcharts illustrating a preferred embodiment of the system in accordance with the present invention.
Figure 2B:
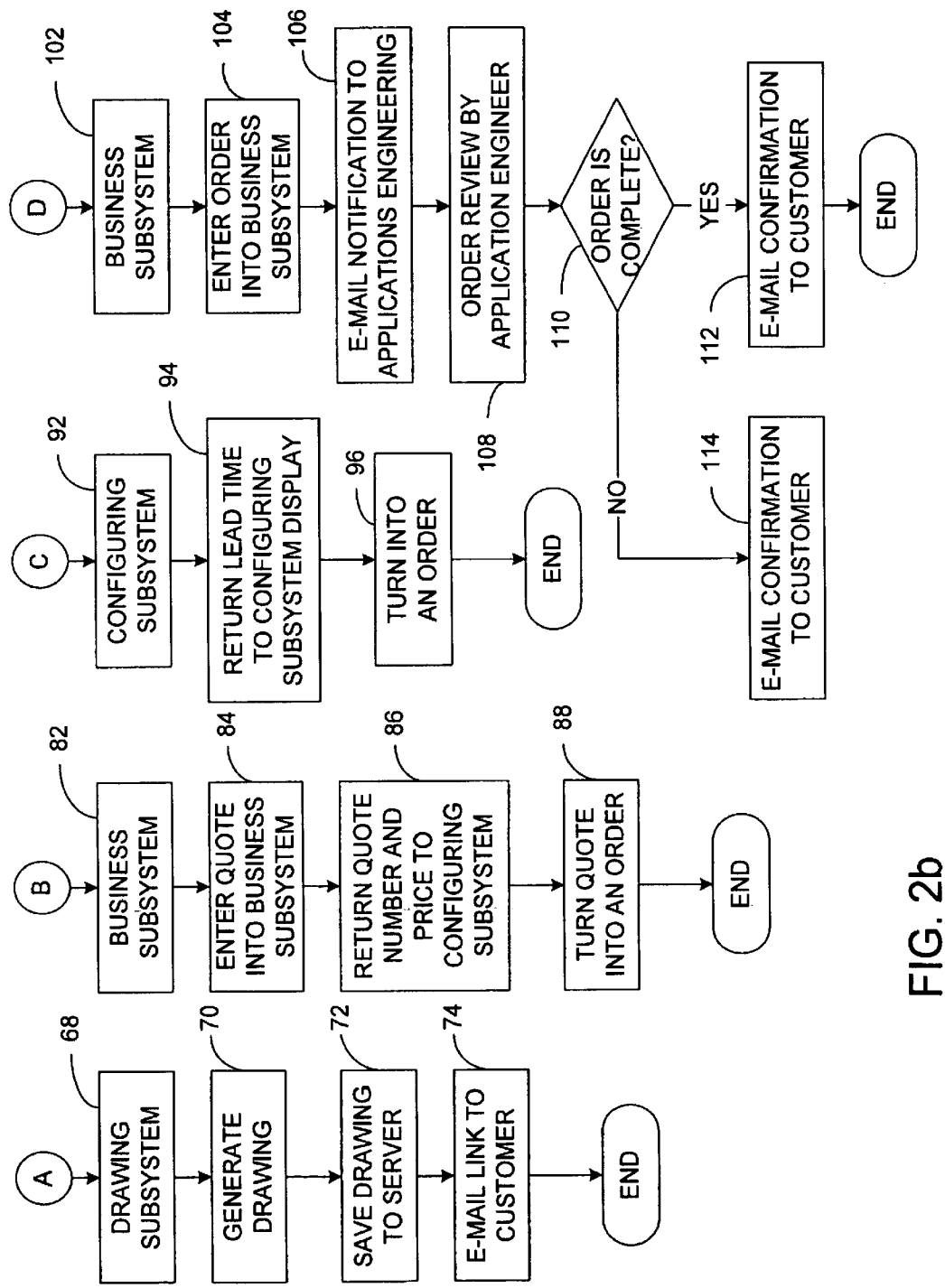

FIGS. 2a and 2b are flowcharts illustrating a preferred embodiment of the system in accordance with the present invention. The method beings at step 52 with a user or a customer logging into a digital network such as, the Internet or an Intranet. The Internet typically comprises a vast number of computers in computer network that are interconnected through communication links. The interconnected computers exchange information using various services, such as, electronic mail, and the world wide web ("WWW"). The WWW service allows a server computer system for example, a web server or a web site to send graphical web pages of information to a remote customer computer system 20. The remote customer computer system can then display web pages. Each resource for example, a computer or web page of the WWW is uniquely identifiable by a Uniform Resource Locator ("URL"). To view a specific web page, a customer computer system 20 specifies the URL for the web page in the request, for example, in a HyperText Transfer Protocol request. The request is forwarded to the web server that supports that web page. When that web server receives the request, it sends that web page to the customer computer system 20. When the customer computer system receives that web page, it typically displays that web page using a browser. A browser is a special purpose application program that effects the requesting and the displaying of web pages. Any WWW browser on any personal computer platform, such as, but not limited to, Macintosh, Windows 95, Windows NT, and DOS, may be used.

Web pages are typically defined using HyperText Markup Language ("HTML"). HTML provides a standard set of texts that define how a web page is to be displayed. When a user instructs the browser to display a web page, the browser sends a request to the server computer system to transfer to the customer computer system the HTML document that defines the web page. When the requested HTML document is received by the customer computer system, the browser displays the web page as defined by the HTML document. The HTML document contains various texts that control the displaying of texts, graphics, control and other features.

The WWW is specially conducive to conducting electronic commerce. The web server computer system may provide an electronic version of a catalog that lists the items that are available. Thus the user at step 52 logs in to the WWW at step 54. Once the user has gained access into the system, the user is offered two options. The first being at step 56, the user is given an option to look up a previous configuration. In the second option at step 58, the user can choose the option of configuring a new injection molding system. At step 62, once the user has opted to configure a new system, the user accesses the configuring subsystem 12. The configuring subsystem 12 then interacts with the other subsystems in system 10 such as, the processing subsystem 16 and the business subsystem 14 as described with respect to FIG. 1. At step 64, the user then chooses if they want to generate a drawing for their system that was just configured or get a cost or a quote for the configuration that they specified, or they can get schedule information and order the configuration they just defined. The same option at step 64 is also available to a user who had chosen to look up a previous configuration at step 56 which in turn accesses an archive database 60.

If the user decides to generate a drawing of the configured injection molding system at step 64, then a file of characteristics or processed customer inputs are accessed per step 66 for the drawing subsystem 18. The resulting characteristics are sent to the drawing subsystem at step 68. The drawing subsystem 18 then generates the drawings at step 70. The drawings are saved to a file system in the server, per step 74. The customer then gains access to the generated drawings using, but not limited to, an electronic mail link that is provided to the customer per step 74.

If at step 64 the customer or user had determined to get a quote or a cost estimate for the configured system, then a file of characteristics is accessed for the business subsystem at step 80. The file of characteristics is sent to the business subsystem 14 at step 82. The business subsystem 14 then processes the processed inputs or characteristics and enters a quote into the system at step 84. At step 86, the quote containing the quantities and prices may then be displayed to the customer in the configuring subsystem 12. The customer at this point can choose to effectuate an order based on the return quote at step 88.

If the customer had chosen to determine the lead time and schedule for the configured system at step 64, then the information required to determine the schedule information is accessed at step 90. The quote information is sent to the configuring subsystem 12 at step 92 which processes the information and returns a schedule and lead time to a configuring subsystem 12 which can be viewed by the customer. At step 96, this particular schedule can be implemented into an order by the customer. Upon configuring the system using the configuring subsystem 12, the user can use step 64 to directly order the configuration without the need to generate drawings or get a quote or schedule information for the configuration. At step 100, the file of characteristics is accessed for the business subsystem 14. These characteristics are sent to the business subsystem 14 at step 102. The business subsystem at step 104 processes the order. At step 106, an electronic mail notification is sent to the verifying personnel, such as an application engineer. At step 108, the verifying personnel reviews the configured system to verify the functionality, safety, manufacturability and applicability of the customized design. Once positively reviewed, the order is completed at step 110, and an electronic mail confirmation is sent to the customer at step 112. If the review is not favorable, then per step 114, an electronic mail request for further information or alterations is sent to the customer to ensure a design that is manufacturable, functional, and safe.

Figure 3:
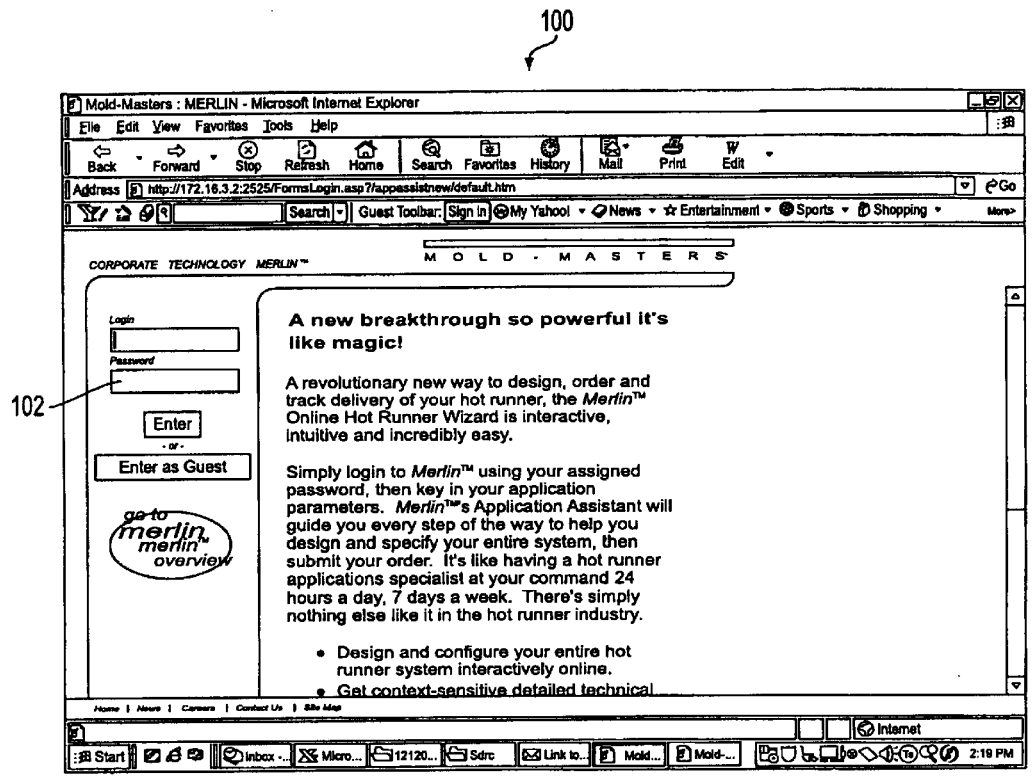
FIG. 3 is an illustration of a computer screen display showing the login entry process into the configuring subsystem in accordance with a particular embodiment of the present invention.

FIG. 3 is an illustration of a computer screen display 100 showing the login entry process into the configuring subsystem in accordance with one particular embodiment of the present invention. The configuring subsystem 12 is password protected in the interest of security, as indicated by the login menu in the password entry area 102 shown in the computer screen display 100. The "security" of the system could be provided through any of the many techniques known in that field. The configuring subsystem 12 provides the ability for a customer to custom design, order and track the delivery of injection molding systems. The configuring subsystem 12 is an interactive expert system which is intuitive and easy to use by a customer.

Figure 4:
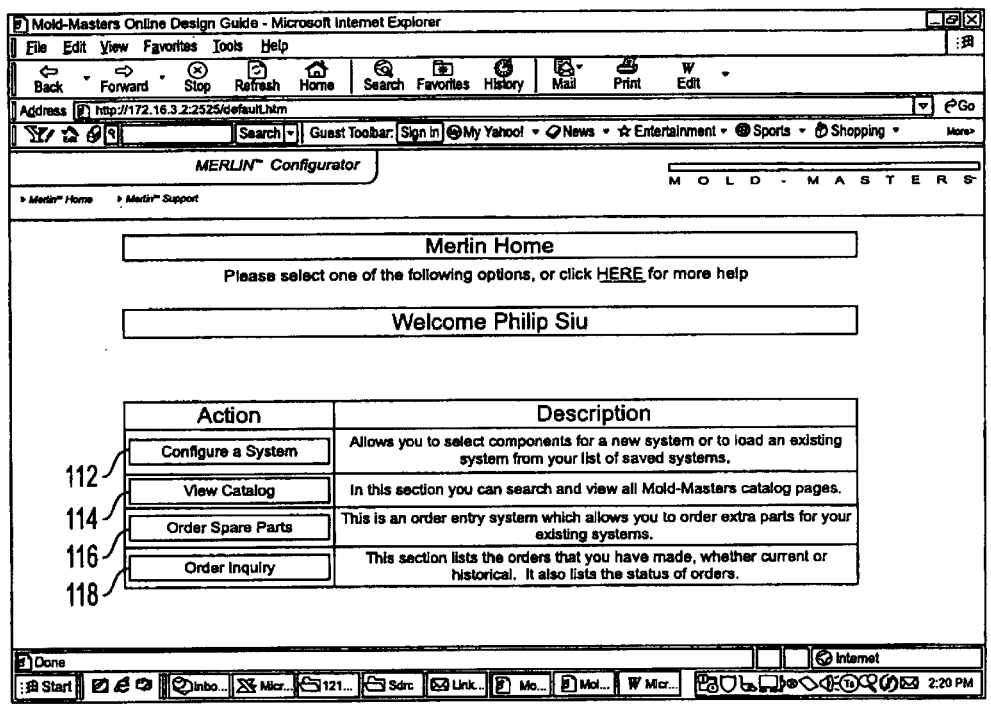
FIG. 4 is an illustration of a computer screen display of the options offered by a particular embodiment of the configuring subsystem in accordance with the present invention.

FIG. 4 is an illustration of a computer screen display 110 of the options offered by a particular embodiment of the configuring subsystem in accordance with the present invention. The configuring subsystem 12 has four options offered to the customer 20, once they have accessed the system after going through the security measures of logging in as described with respect to FIG. 3. The computer screen display 110 illustrates the four options, one being the option to configure a system 112, the second being the option to view a catalog 114, the third being the option to order spare parts 116 and the fourth being the option to perform an order inquiry 118. The "configure a system" 112 option allows the customer to select components to either configure a new system or access an existing system from previously saved systems. The option of viewing a catalog 14 allows a customer a view electronic versions of component catalog or system catalog pages. The option to order spare parts 116 is an order entry system which allows the customer to order extra parts for existing systems. The option of order inquiry 118 allows a customer to view orders that were previously entered or view a listing of current orders. In addition, the order inquiry option 118 lists the status of orders.

Figure 5:
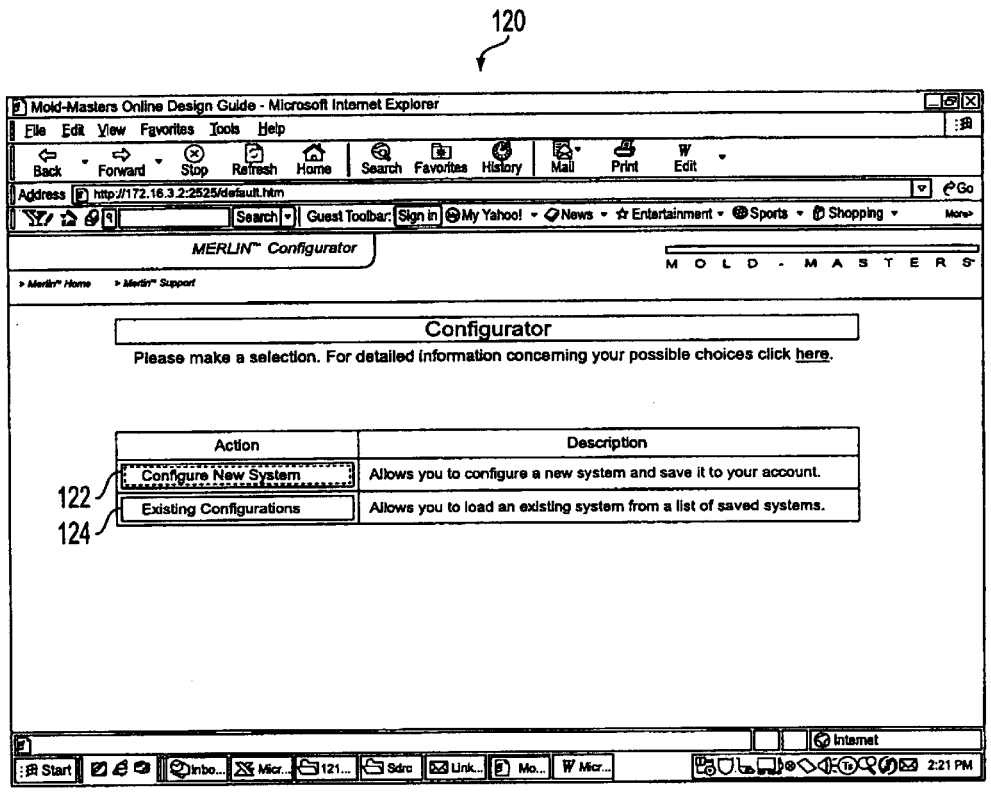
FIG. 5 is an illustration of a computer screen display of the configuring options offered by a particular embodiment of the configuring subsystem in accordance with the present invention.

FIG. 5 is an illustration of a computer screen display 120 of configuring options offered by a particular embodiment of the configuring subsystem 12 in accordance with the present invention. The computer screen 120 illustrates the selection options under the "configure a system" option 112. The customer is asked to make a selection between a "configure a new system" option 122, or an "existing configurations" option 124. The "configure a new system" option 122 allows the customer to configure a system and save it to their account. The existing configurations system option 124 allows the customer to access an existing system from the list of saved systems.

Figure 6:
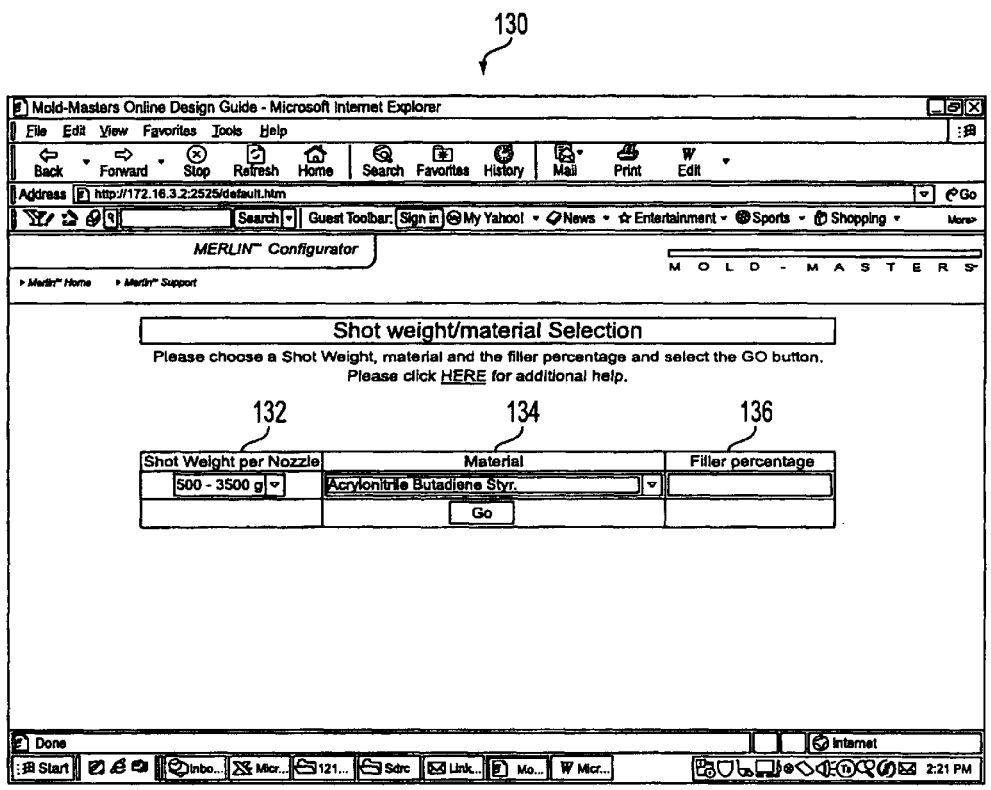
FIG. 6 is an illustration of a computer screen display of the customer inputs relating to material weight and selection in accordance with a particular embodiment of the present invention.

FIG. 6 is an illustration of a computer screen display 130 of the customer inputs relating to material weight and selection in accordance with the present invention. Once the "configure a new system" option 122 has been chosen as discussed with respect to FIG. 5, the customer is then asked to input a shot weight, material, and fill up percentages information into a user input display. The shot weight, material and fill up percentages can be selected from pull down menus that are available. Another option, in this computer screen display 130 is that the shot weight 132, material 134, and fill up percentages 136 can be manually entered in the respective input graphical selection inputs.

Figure 7:
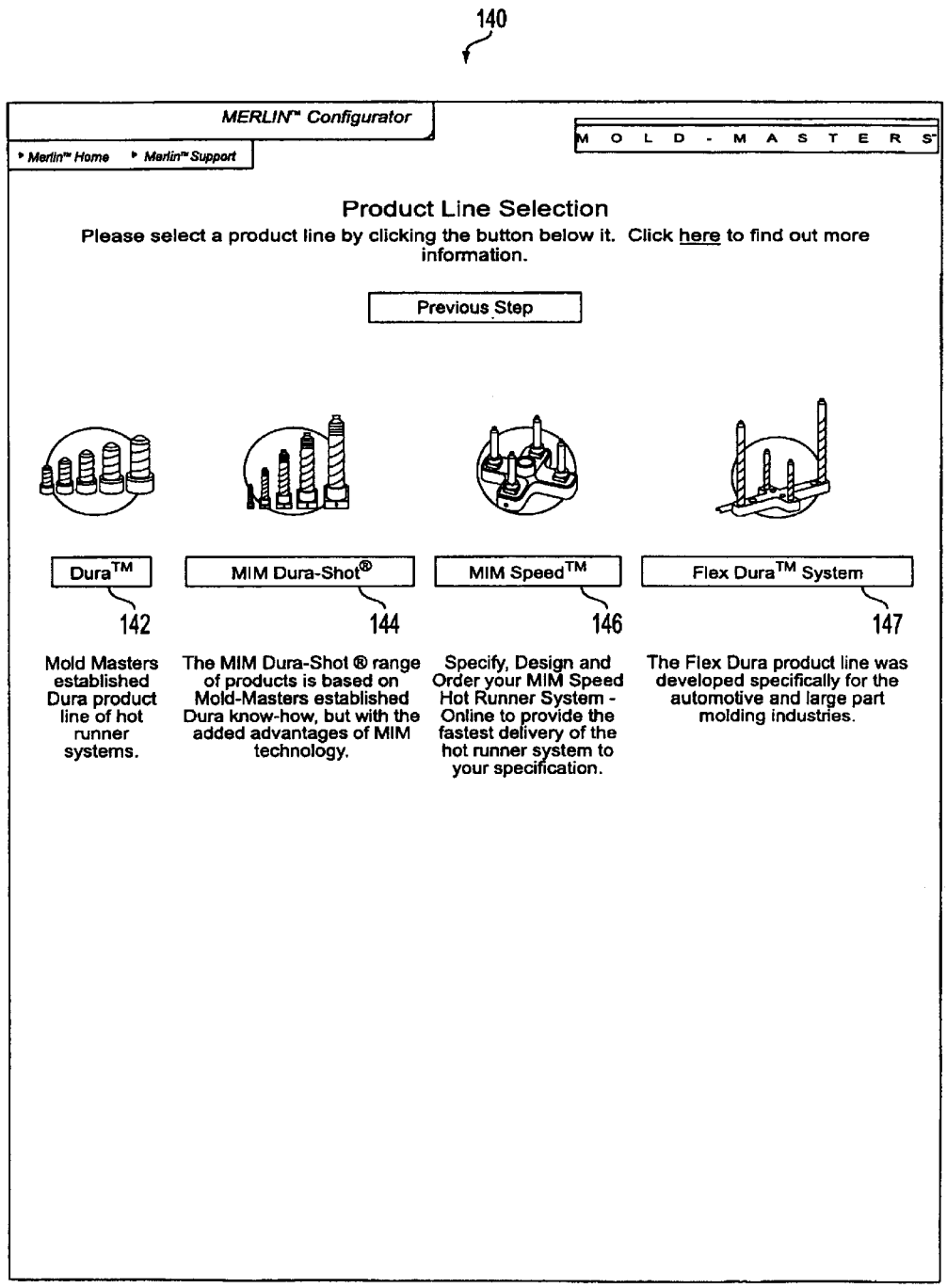
FIG. 7 is an illustration of a computer screen display of the product line options offered by a particular embodiment of the configuring subsystem in accordance with the present invention.

FIG. 7 is an illustration of a computer screen display 140 of the product line options offered by a particular embodiment of the configuring subsystem 12 in accordance with the present invention. The customer is prompted as shown on screen 140 to select a product line that is provided by the manufacturer by clicking on a corresponding button placed below the options, such as, the graphical selection input 142 for Dura™, the MIM Dura-Shot® graphical selection input 144, the graphical selection input 146 for MIM Speed™, or the Flex Dura™ System graphical selection input 147. There is a brief description pertaining to each of the four product lines. Although the screen display 140 shows four product lines, the present invention is not limited to just the four product lines. The trademarks and products shown here for illustration are obtained from Mold-Masters Limited, of Georgetown, Ontario, Canada. Different manufacturers would be expected to supply their own information. More or fewer product lines can be offered to a customer.

Figure 8:
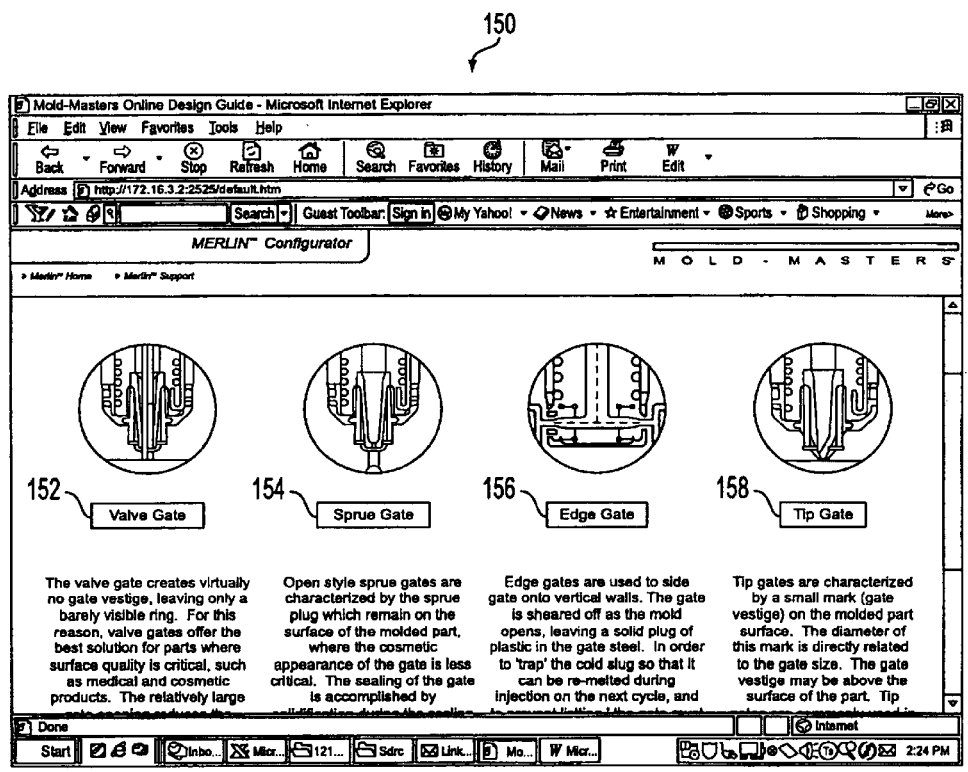
FIG. 8 is an illustration of a computer screen display of the gating options offered by a particular embodiment of the configuring subsystem in accordance with the present invention.

FIG. 8 is an illustration of a computer screen display 150 of the gating options offered by a particular embodiment of the configuring subsystem 12 in accordance with the present invention. The computer screen display 150 is the next sequential screen after the computer screen 140 described with respect to FIG. 7. The customer 20 is queried to choose between the different gating technologies that they would like to use. The options that are presented in the example illustrated include a valve gate 152, a sprue gate 154, an edge gate 156, and a tip gate 158. The customer is provided with information regarding all the gating technologies provided. Although there are four gating technologies described herein, the screen 150 can include fewer or more gating technologies.

Figure 9:
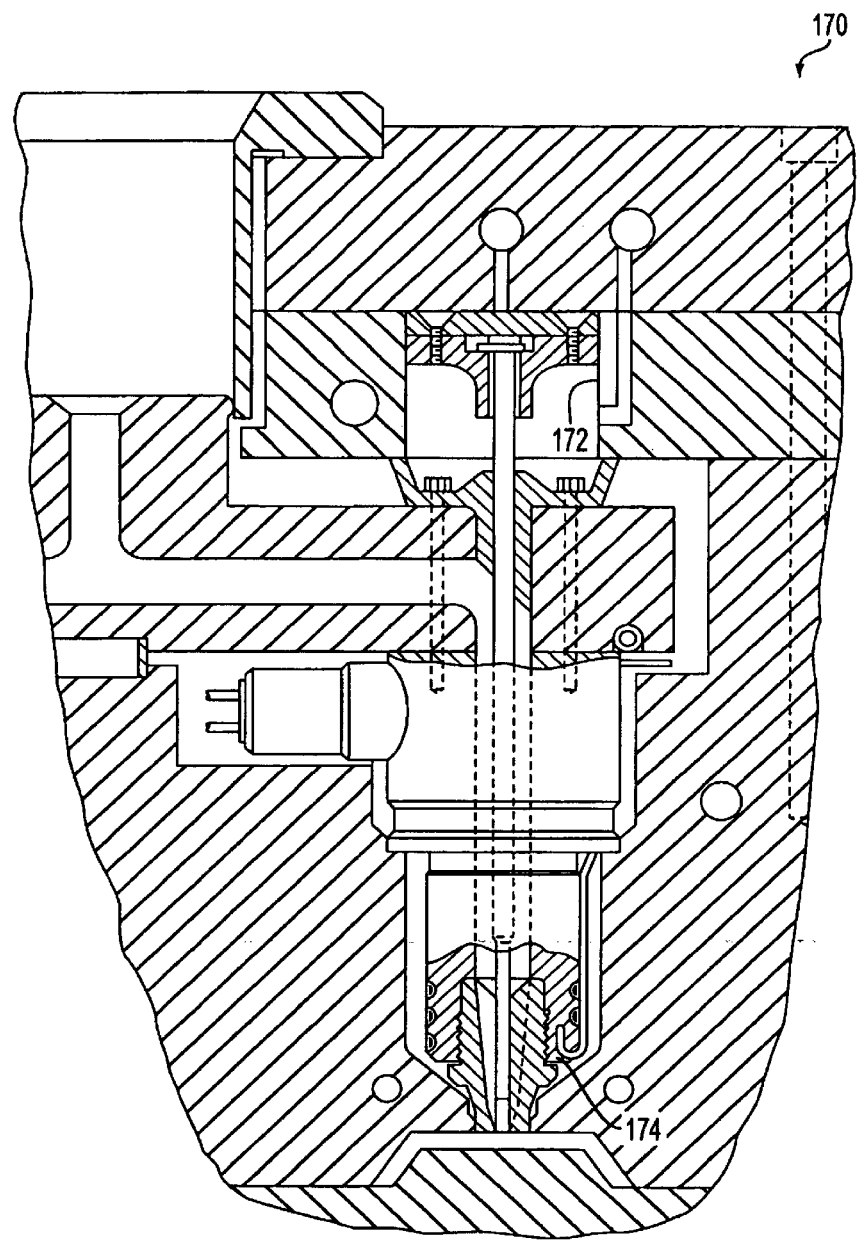
FIG. 9 is sectional view of a portion of a multi-cavity valve gated injection molding system showing a one-piece gate and locating insert according to one electronic catalog page offered by a particular embodiment of the configuring subsystem of the present invention.

FIG. 9 is sectional view of a portion of a multi-cavity valve gated injection molding system 170 showing a one-piece gate and locating insert according to one electronic catalog page offered by a particular embodiment of the configuring subsystem 12 in accordance with the present invention. The injection molding system 170 of this example is described in a U.S. Pat. No. 5,849,343, which issued on Dec. 15, 1998, and is incorporated herein by reference. The customer can make changes to many different dimensions of the multi-cavity valve gated injection molding system 170 such as, for example, to the dimensions of the cylinder 172 and to the area of the nozzle 174.

Figure 10:
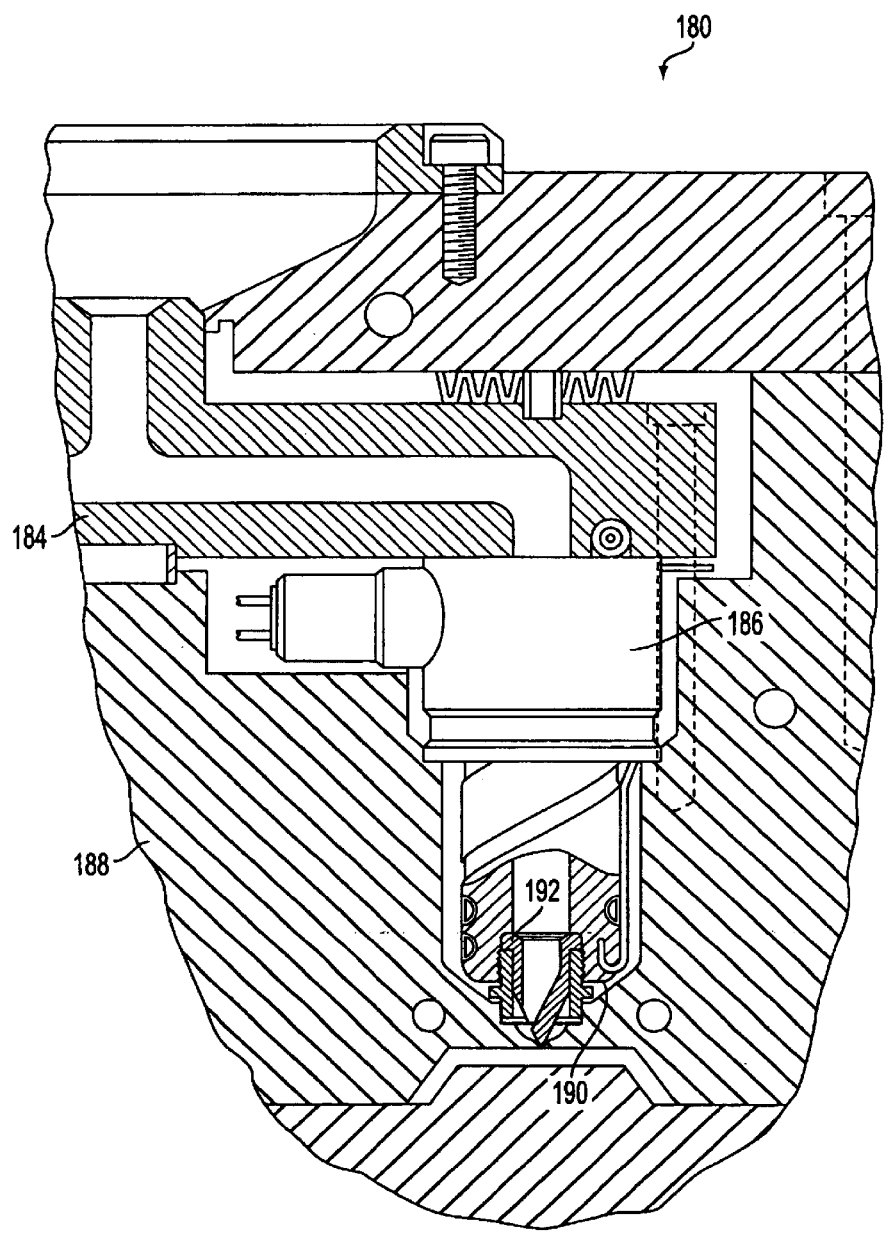
FIG. 10 is a sectional view of a portion of a multi-gate injection molding system showing a torpedo according to one electronic catalog page offered by a particular embodiment of the configuring subsystem in accordance with the present invention.

FIG. 10 is a sectional view of a portion of an illustrative multi-gate injection molding system 180 including a torpedo 192, according to one electronic catalog page offered by a particular embodiment of the configuring subsystem 12 in accordance with the present invention. The injection molding system 180 of this example is described in a U.S. Pat. No. 5,658,604, which issued on Aug. 19, 1997, and is incorporated herein by reference. The system 180 has a melt distribution manifold 184 interconnecting several heated nozzles 186 in a mold 188. The customer can change several dimensions, such as, for example, the dimension of the front end 190 of each nozzle 186 as well as the dimensions of the torpedo 192.

Figure 11:
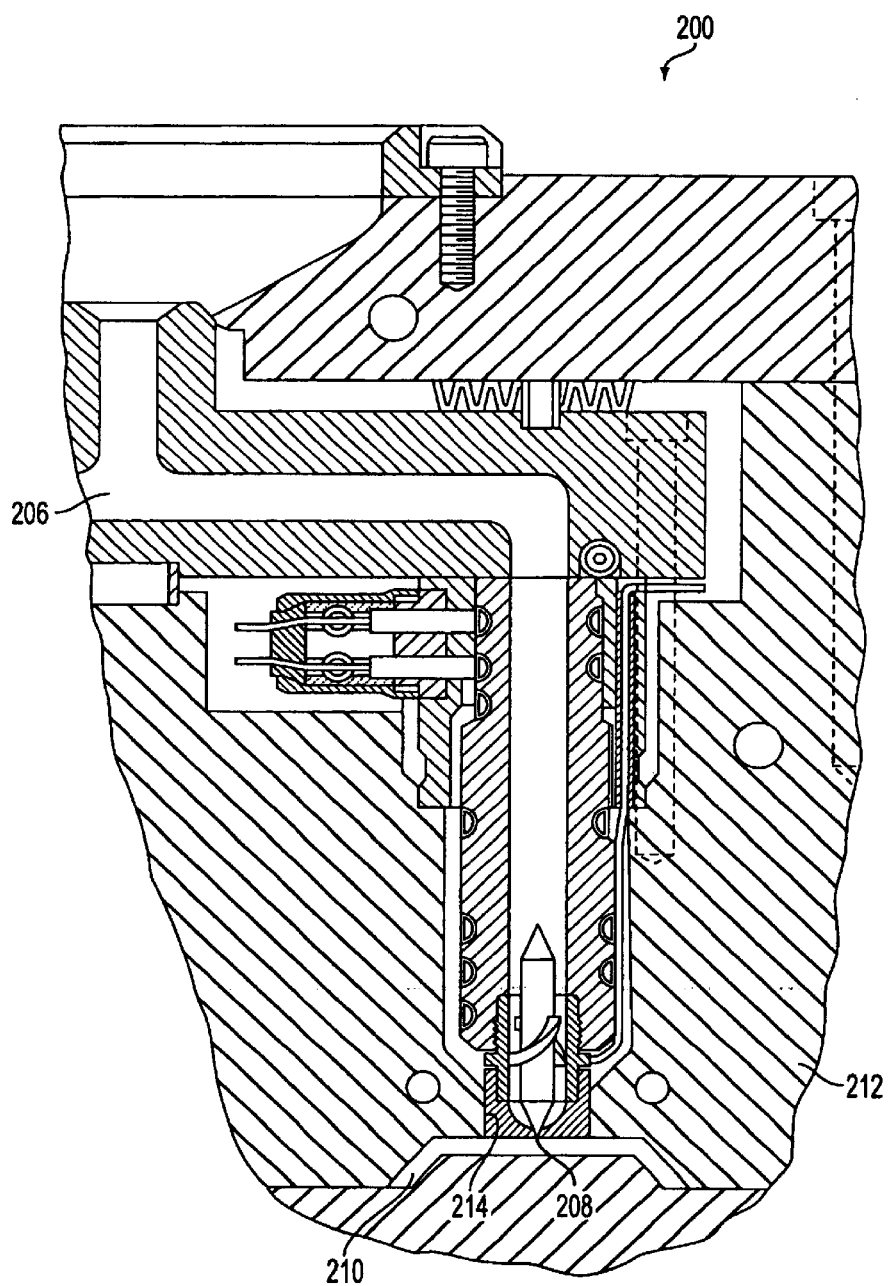
FIG. 11 is a partial sectional view of a portion of a multi-cavity injection molding system according to one electronic catalog page in accordance with a particular embodiment of the present invention.

FIG. 11 is a partial sectional view of a portion of an illustrative multi-cavity injection molding system 200 according to one electronic catalog page in accordance with the present invention. The injection molding system 200 of this example is described in a U.S. Pat. No. 5,421,716, which issued on Jun. 6, 1995, and is incorporated herein by reference. The multi-cavity injection molding system 200 has several steel nozzles to convey pressurized plastic melt through melt passage 206 to respective gates 208 leading to a different cavity 210 in the mold 212. The customer can change and configure the system by defining their own dimensions such as, for example, defining the dimensions for the cylindrical opening 214.

Figure 12:
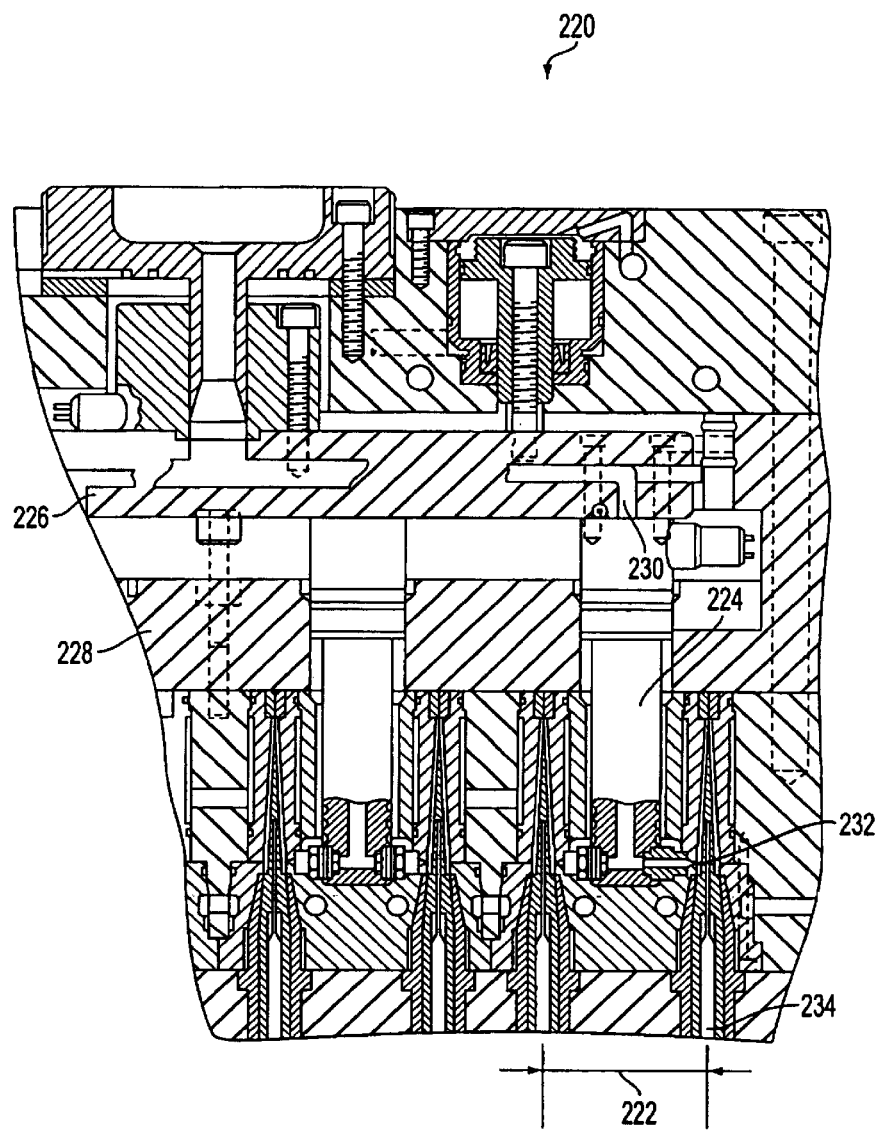
FIG. 12 is a sectional view of a portion of a side gated molding system in the closed position according to one electronic catalog page in accordance with a particular embodiment of the present invention.

FIG. 12 is a sectional view of a portion of an illustrative side gated molding system 220 in the closed position according to one electronic catalog page in accordance with the present invention. The injection molding system 220 of this example is described in a U.S. Pat. No. 5,952,016, which issued on Sep. 14, 1999, and is incorporated herein by reference. The multi-cavity injection molding system 220 has several heated steel nozzles 224 extending from a heated steel melt distribution manifold 226 in a mold 228 to convey pressurized melt to the melt passage 230 to several gates 232 spaced around each heat nozzle 224. The customer can change the dimensions such as, the length 222 between the central cooling conduits 234.

Figure 13:
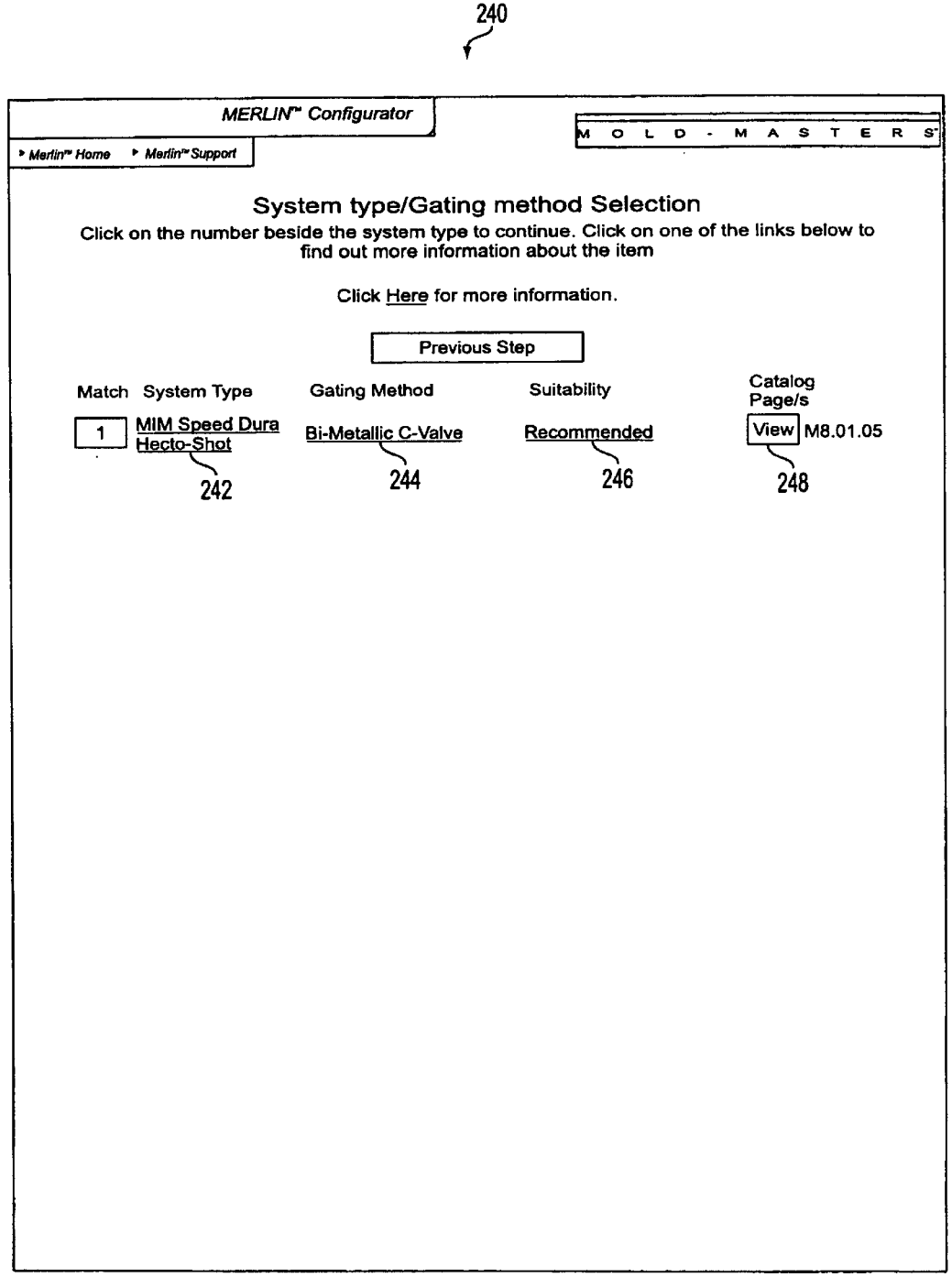
FIG. 13 is an illustration of a computer screen display of the system type and gating method selection as displayed by a particular embodiment of the configuring subsystem in accordance with the present invention.

FIG. 13 is an illustration of a computer screen display 240 of the system type and gating method selection as displayed by a particular embodiment of the configuring subsystem 12 in accordance with the present invention. This computer screen display 240 itemizes the system type chosen, such as the MIM Speed Dura Hecto-Shot system 242, and the gating method selected, such as the Bi-Metallic C-Value 244. It further provides recommendations for further options if the configured design chosen up to this point, such as the system type and gating methodology, is suitable for the functional system as shown in the graphical selection input 246. In addition, the screen provides visibility into the electronic versions of the catalog pages as viewed by clicking on the graphical selection input "view" 248.

Figure 14:
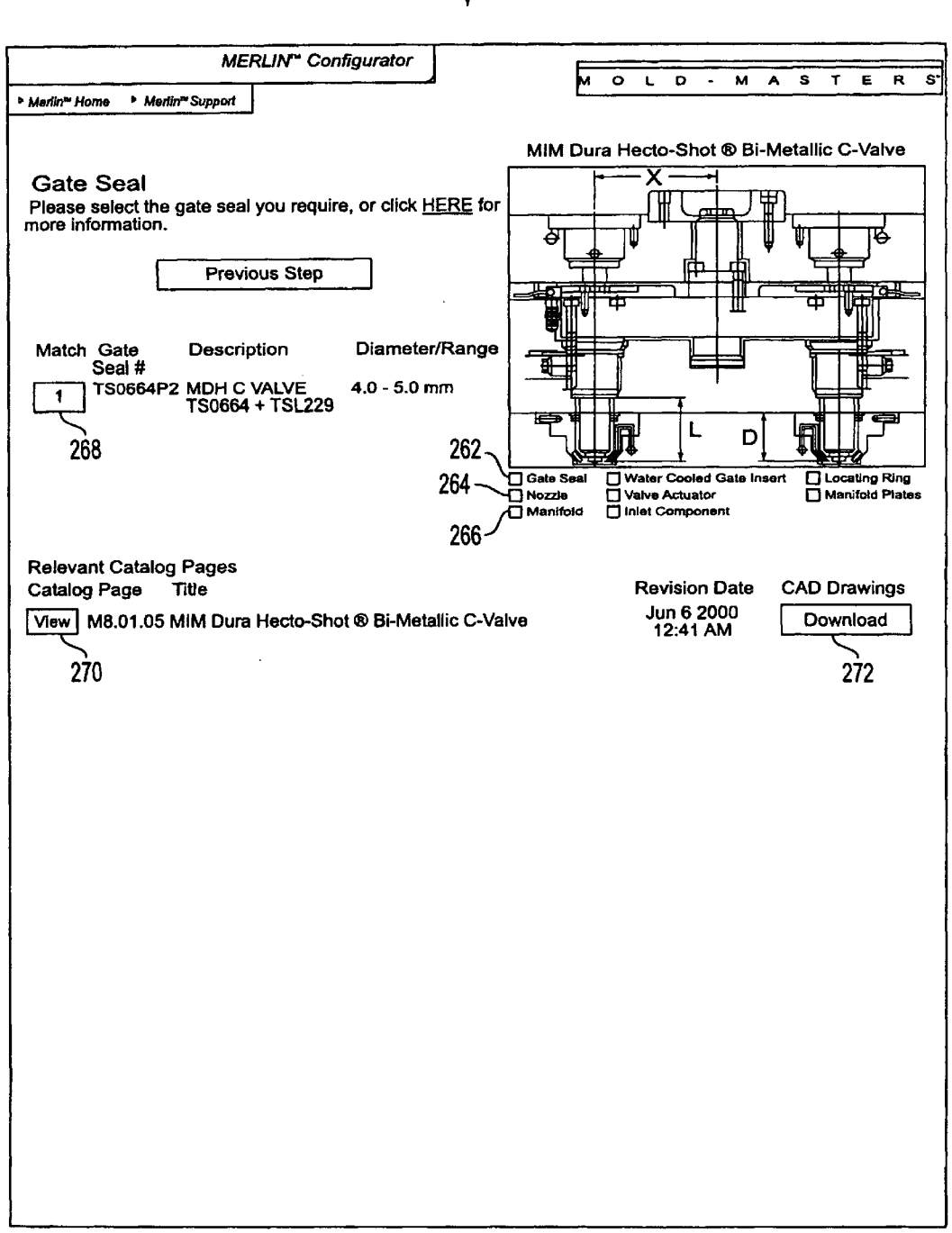
FIG. 14 is an illustration of a computer screen display of the gate seal selection process as offered by a particular embodiment of the configuring subsystem in accordance with the present invention.

FIG. 14 is an illustration of a computer screen display 260 of the gate seal selection process as offered by a particular embodiment of the configuring subsystem 12 in accordance with the present invention. As displayed in right hand side of the screen, the customer is asked to choose several components and system elements, such as the gate seal 262, a nozzle 264, a manifold 266, and so on. In this exemplary embodiment, the first component that the customer can specify once the system type and gating methodology has been selected previously is the gate seal 262. The customer is prompted to get more information from the electronic version of the catalog, or to provide her own specification, or to select the gate seal provided by the configuring subsystem in the match graphical selection input 268. The gate seal number with the appropriate descriptions such as, diameters and ranges are displayed for the match graphical selection input 268 configuring subsystem selection. Further, catalog pages of the gate seal selected by the configuring subsystem 12 can be viewed by clicking on the graphical selection input 270 along with the option of accessing computer-aided design (CAD) drawings by clicking on the graphical selection input 272.

Figure 15:
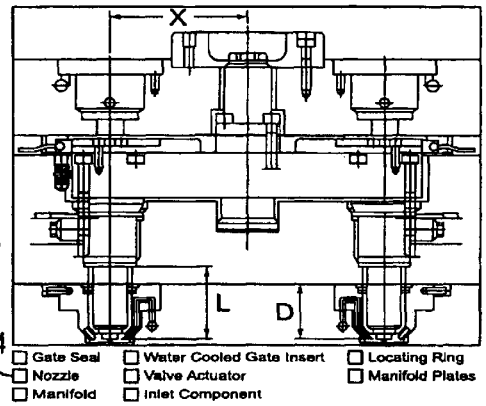
FIG. 15 is an illustration of a computer screen display of the nozzle selection process as offered by a particular embodiment of the configuring subsystem in accordance with the present invention.

FIG. 15 is an illustration of a computer screen display 280 of the nozzle selection process as offered by a particular embodiment of the configuring subsystem 12 in accordance with the present invention. The next component, once the gate seal 262 has been chosen, is typically the nozzle component 264. Once again the customer can provide the dimensions for a nozzle or select dimensions of matches that the configuring subsystem 12 returns based on the selected system and gating technology. In this example, four matches 282, 284, 286, and 288 have been returned as possible nozzle selections for the customer selected system and gating technology. The relevant catalog pages can be viewed by clicking on the graphical selection input 290 and corresponding drawings can be downloaded by the customer by clicking on the download graphical selection input 292.

Figure 16:
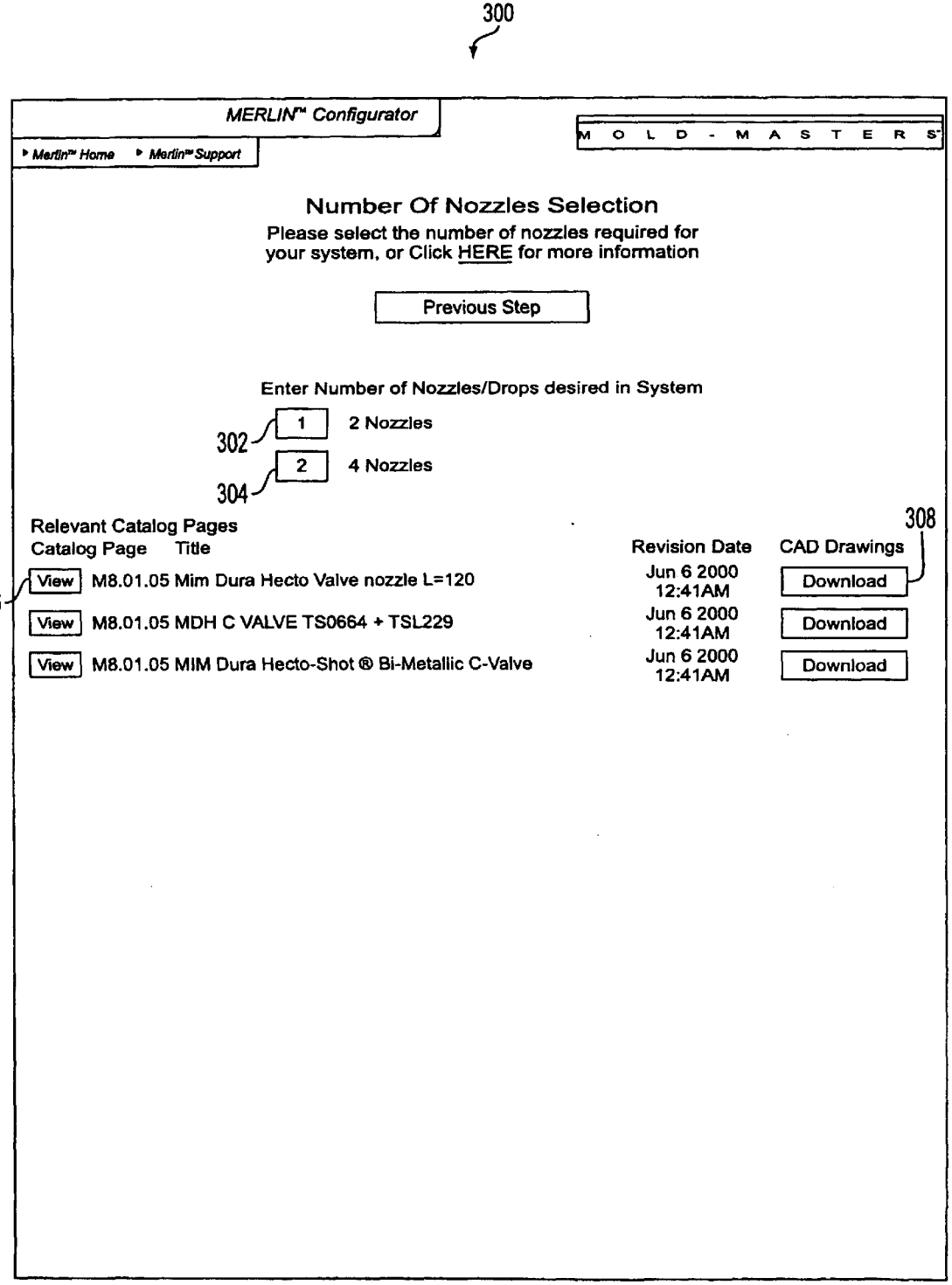
FIG. 16 is an illustration of a computer screen display of the nozzle quantity selection process as offered by a particular embodiment of the configuring subsystem in accordance with the present invention.

FIG. 16 is an illustration of a computer screen display 300 of the nozzle quantity selection process as offered by a particular embodiment of the configuring subsystem 12 in accordance with the present invention. The computer screen display 300 is the next logical step in configuring the system per a customer specified parameter. Once the nozzles have been chosen as described with respect to FIG. 15, the number of nozzle selection occurs. The customer can input his selection or take guidance from the recommendation of the configuring subsystem 12. The configuring subsystem 12 for this particular example has returned a choice of two nozzles 302 or four nozzles 304. Catalog pages which are the electronic versions of the manufacturer's catalogs can be viewed by clicking on a graphical selection input, such as graphical selection input 306, and similarly CAD drawings for each of the corresponding nozzles can be downloaded by clicking the graphical selection input download 308.

Figure 17:
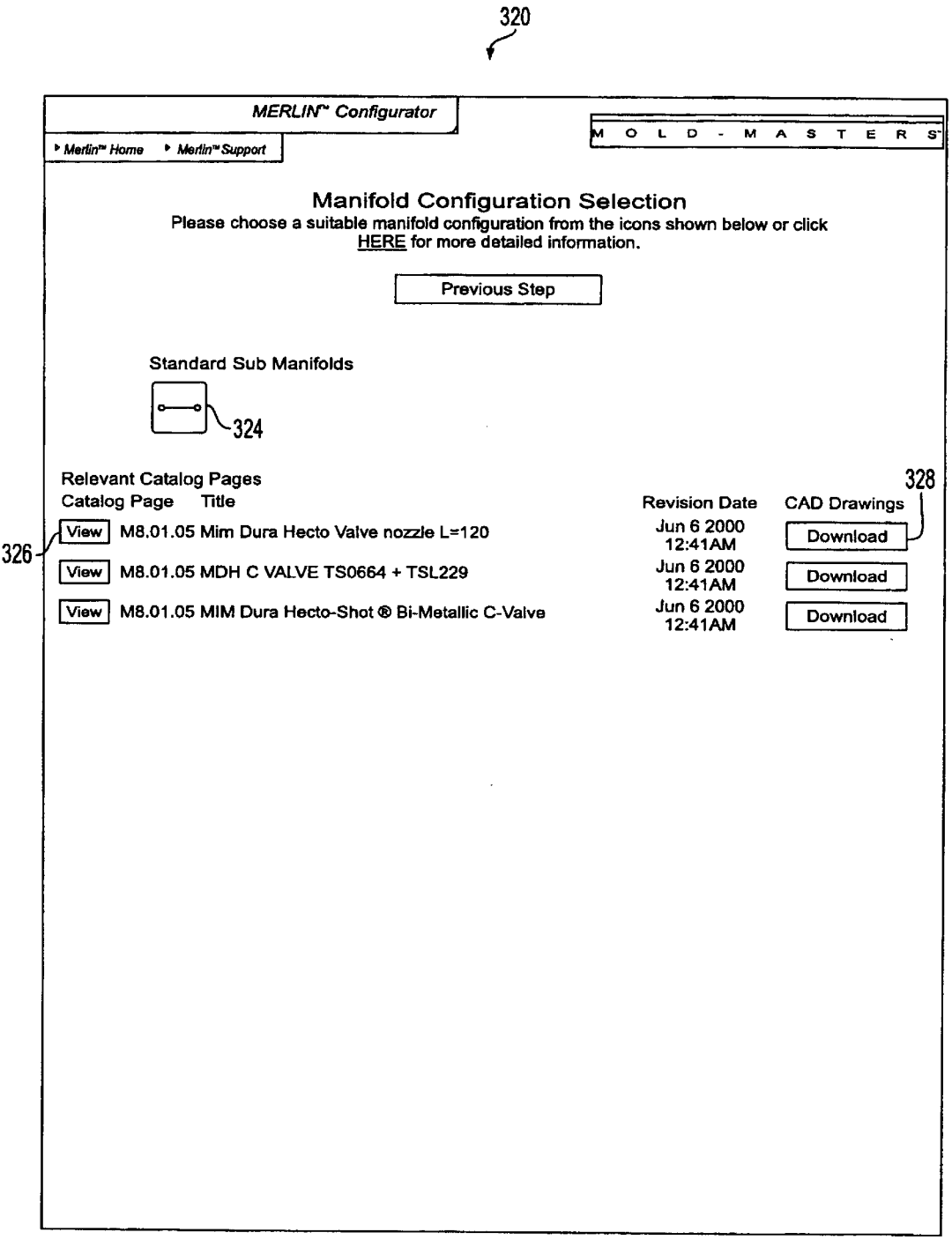

FIGS. 17 and 18 are illustrations of computer screen displays 320, 340 of the manifold configuration selection process as offered by a particular embodiment of the configuring subsystem 12 in accordance with the present invention. The computer screen display 320 which displays a manifold configuring selection screen is the next sequential step that the customer follows to configure an injection molding system based on their specific parameters. The customer can click on the graphical selection input standard sub-manifold 324 in order to enter the dimensions for a manifold using their parameters. The customer can either work with the recommendations of the configuring subsystem 12 which provides a manifold that could function with the system as defined up to this stage. Electronic versions of the configuring subsystem 12 recommendations for the manifold configurations can be viewed by clicking on graphical selection input 326. Corresponding CAD drawing for the recommended manifold can be downloaded by clicking on the graphical selection input download 328. If the customer wants to configure a manifold completely based on their specific dimensions, the customer can respond to a prompt in the screen display 340, and enter his dimensions in graphical selection input 342. Once again, if there are any relevant catalog pages of the electronic versions of the catalog, the customer can view them for the dimensions specified by activating the "view" graphical selection input 344. Drawings for the configuration can be downloaded by clicking on the graphical selection input 346.

Figure 19:
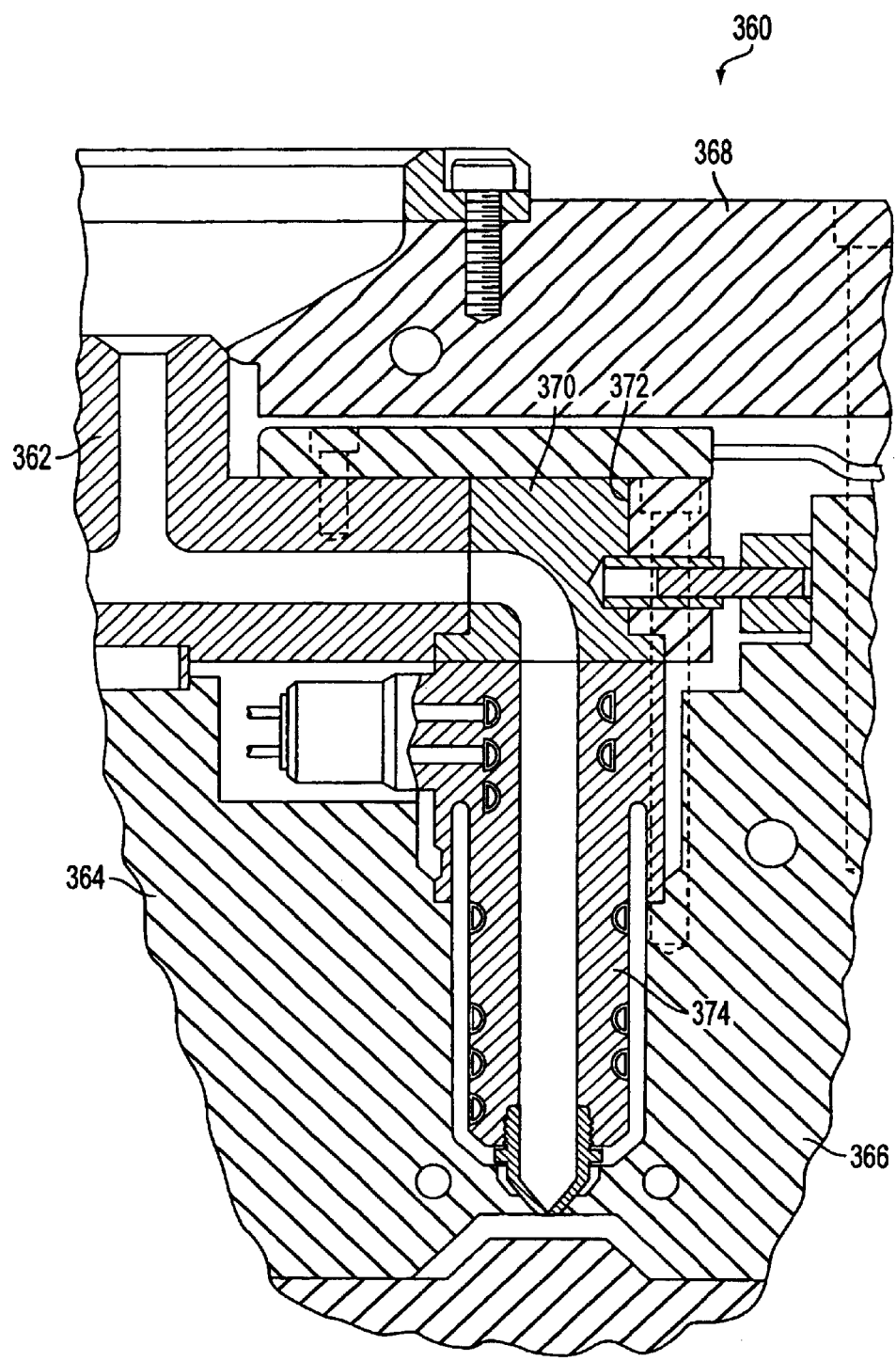
FIG. 19 is a sectional view showing a portion of a multi-cavity injection molding system with a melt distribution manifold according to one electronic catalog page offered by a particular embodiment of the configuring subsystem of the present invention.

FIG. 19 is a sectional view showing a portion of an illustrative multi-cavity injection molding system 360 with a melt distribution manifold according to one electronic catalog page offered by a particular embodiment of the configuring subsystem 12 in accordance with the present invention. The injection molding system 360 is described in a U.S. Pat. No. 5,366,369, which issued on Nov. 22, 1994 and is incorporated herein by reference. The multi-cavity injection molding system 360 has a steel melt distribution manifold 362 mounted in a mold 364 between a cavity plate 366 and a back plate 368. The customer can change many dimensions and can specify a manifold to suit her design, such as specifying the dimensions of a steel insert 370, which is removably located in a transverse opening 372 through the manifold 362 in alignment with each of the nozzles 374.

Figure 20:
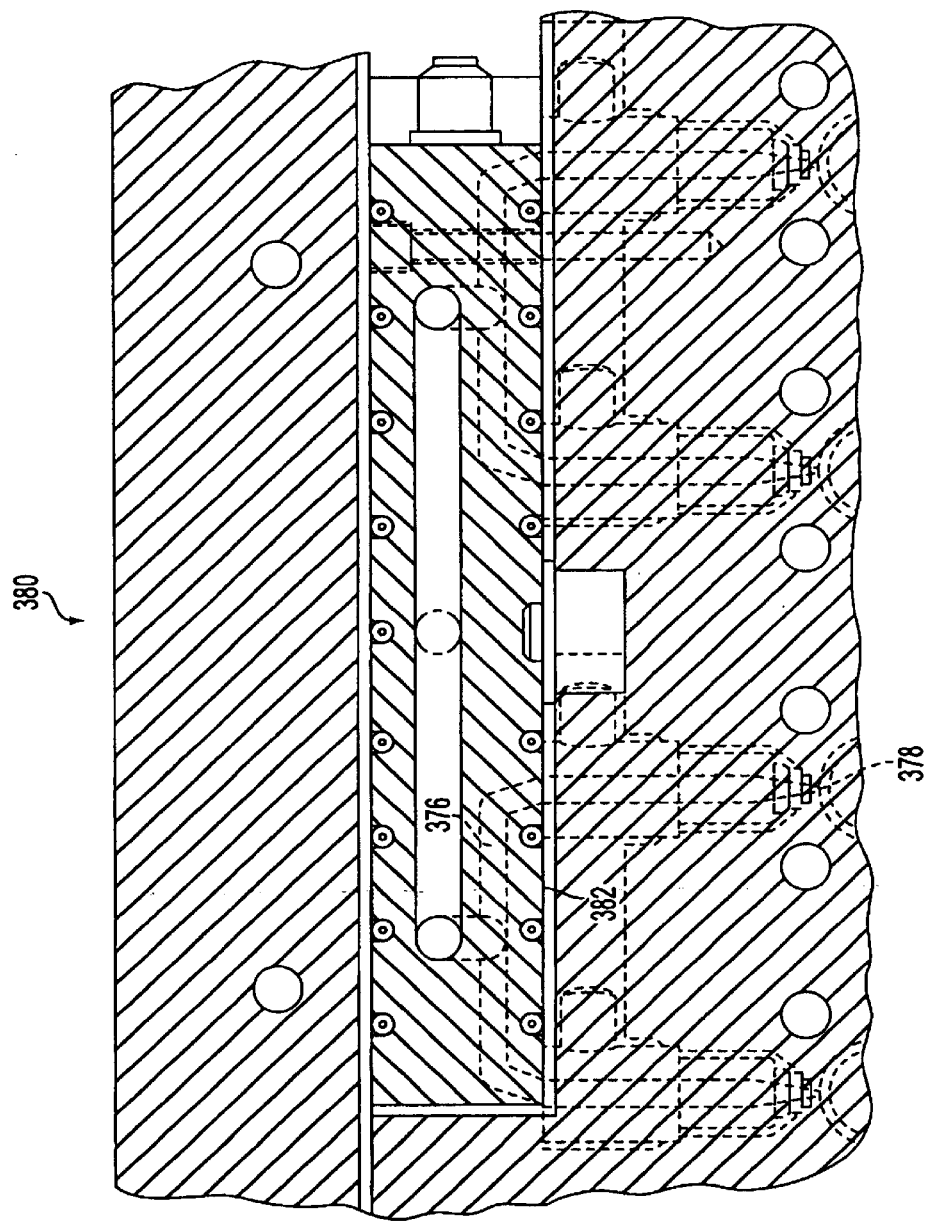
FIG. 20 is a sectional view of a portion of an injection molding system having four heated nozzle manifolds connected to a central manifold in a partially assembled mold according to one electronic catalog page as offered by a particular embodiment of the configuring subsystem of the present invention.

FIG. 20 is a sectional view of a portion of an illustrative injection molding system 380 having four heated nozzle manifolds connected to a central manifold in a partially assembled mold according to one electronic catalog page as offered by a particular embodiment of the configuring subsystem 12 in accordance with the present invention. The injection molding system 380 is described in a U.S. Pat. No. 5,707,664, which issued on Jan. 13, 1998 and is incorporated herein by reference. The injection molding system 380 includes four heated nozzle manifolds 382 connected to a heated central manifold. The arrangement of the various manifolds in connection with the bushing and the configuration of the melt passage 376 ensures that the length melt flow to each gate 378 in the system is exactly the same. The customer can change different dimensions of the manifold such as, length, width and height.

Figure 21:
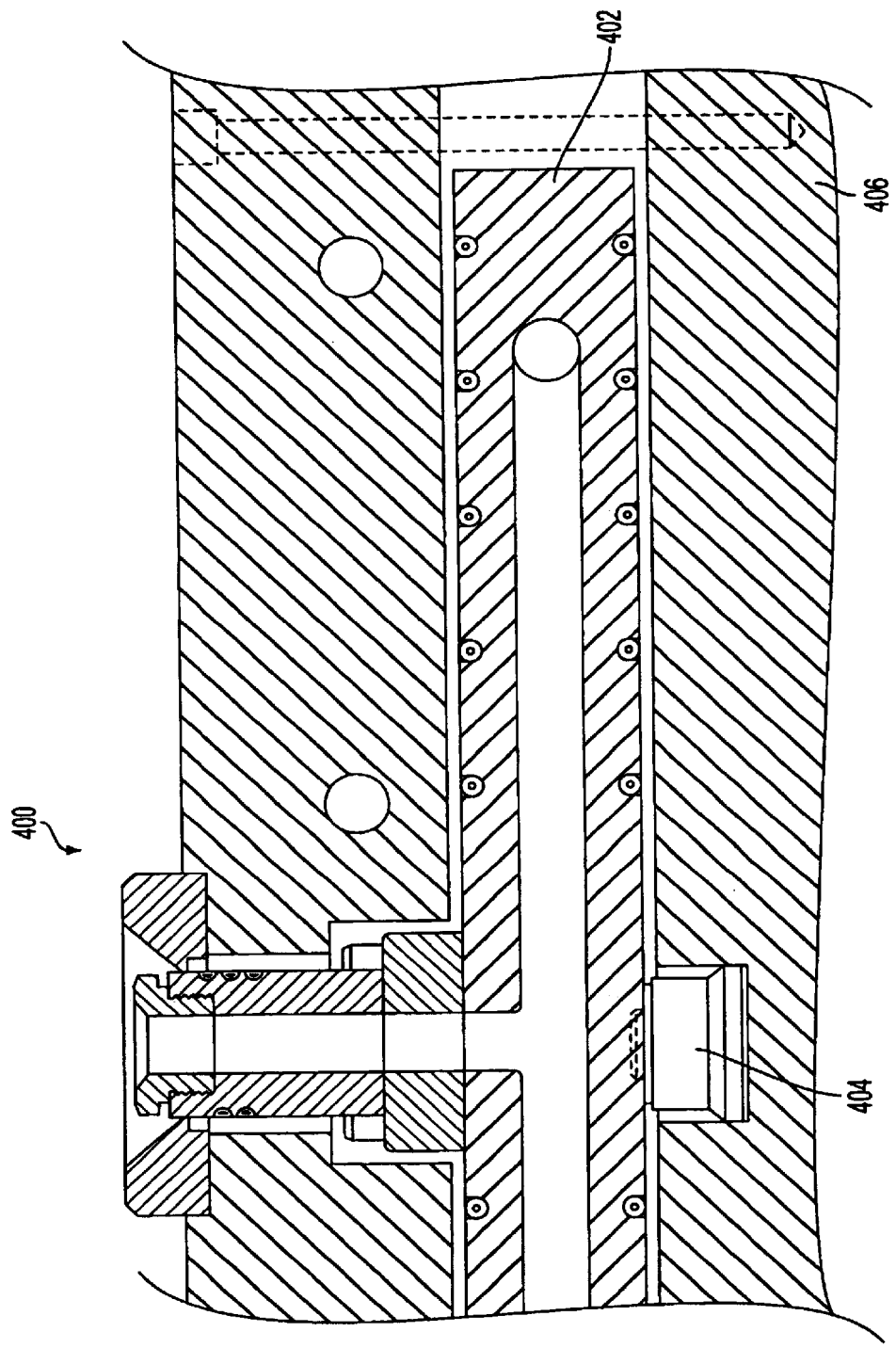
FIG. 21 is a sectional view showing a nozzle manifold after assembly of the mold has been completed as offered by one electronic catalog page of the configuring subsystem in accordance with a particular embodiment of the present invention.

FIG. 21 is a sectional view showing an illustrative nozzle manifold 400 after assembly of the mold has been completed as offered by one electronic catalog page of a particular embodiment of the configuring subsystem 12 in accordance with the present invention. The injection molding system 400 is described in a U.S. Pat. No. 5,705,202, which issued on Jan. 6, 1998 and is incorporated herein by reference. A manifold 402 is centrally located by a central locating ring 404 seated between it and a mold 406. The customer can change several of the dimensions of the manifold such as, the length, width and height of the manifold as well as the placement of the nozzles.

Figure 22:
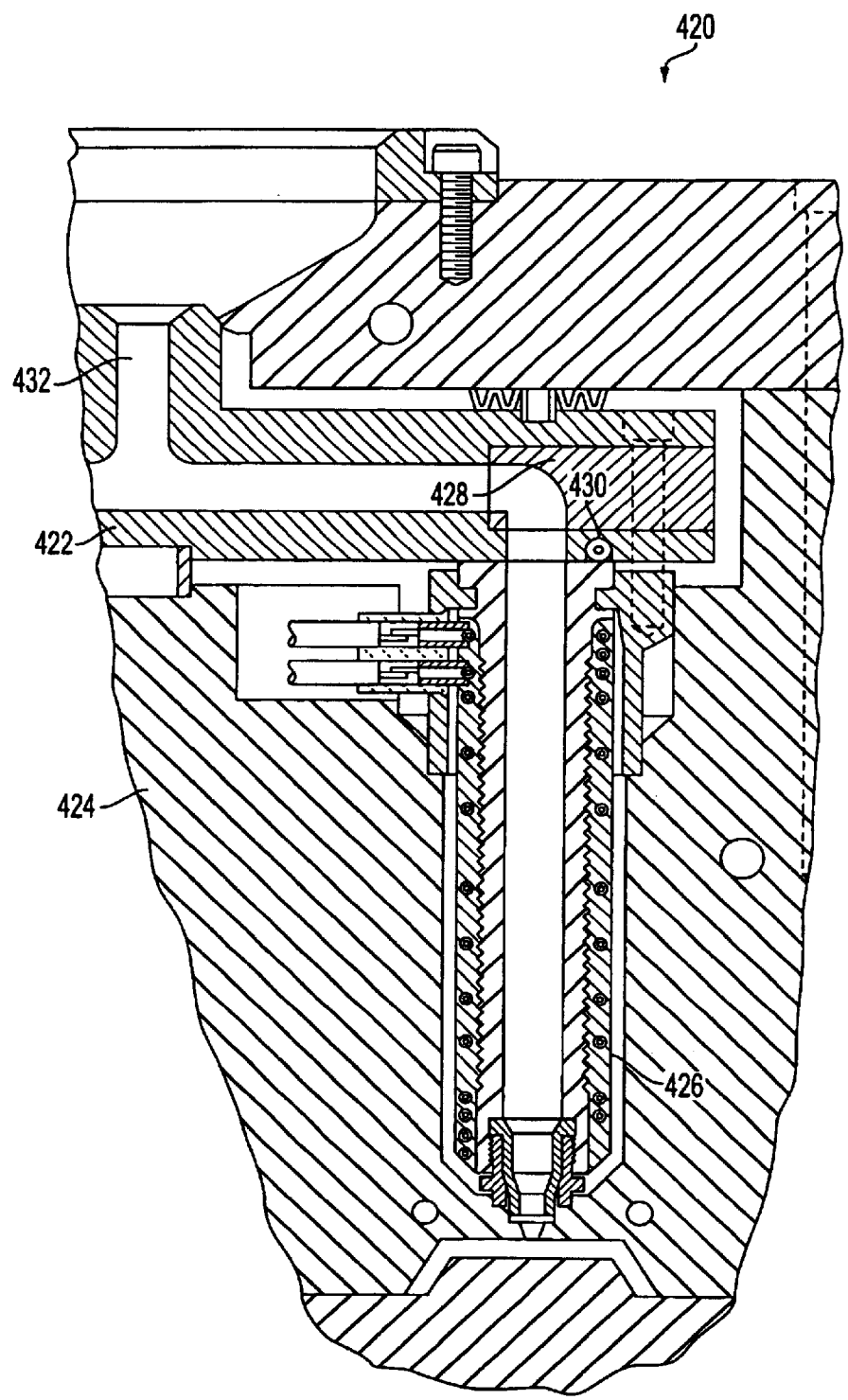
FIG. 22 is a sectional view showing a portion of a multi-cavity injection molding system with a melt distribution manifold according to one electronic catalog page offered by a particular embodiment of the configuring subsystem of the present invention.

FIG. 22 is a sectional view showing a portion of an illustrative multi-cavity injection molding system 420 with a meld distribution manifold according to one electronic catalog page offered by a particular embodiment of the configuring subsystem 12 in accordance with the present invention. The injection molding system 420 is described in a U.S. Pat. No. 5,441,197, which issued on Aug. 15, 1995 and is incorporated herein by reference. The melt distribution manifold 422 is normally mounted in a mold 424 to interconnect a number of spaced nozzles 426 to provide a multi-cavity injection molding system 420. The customer can make modifications to different portions of the system 420. In particular, the customer can specify the dimensions for portions such as, an elbow 428, the heating element 430, and but not limited to, an insulated inlet portion 432.

Figure 23:
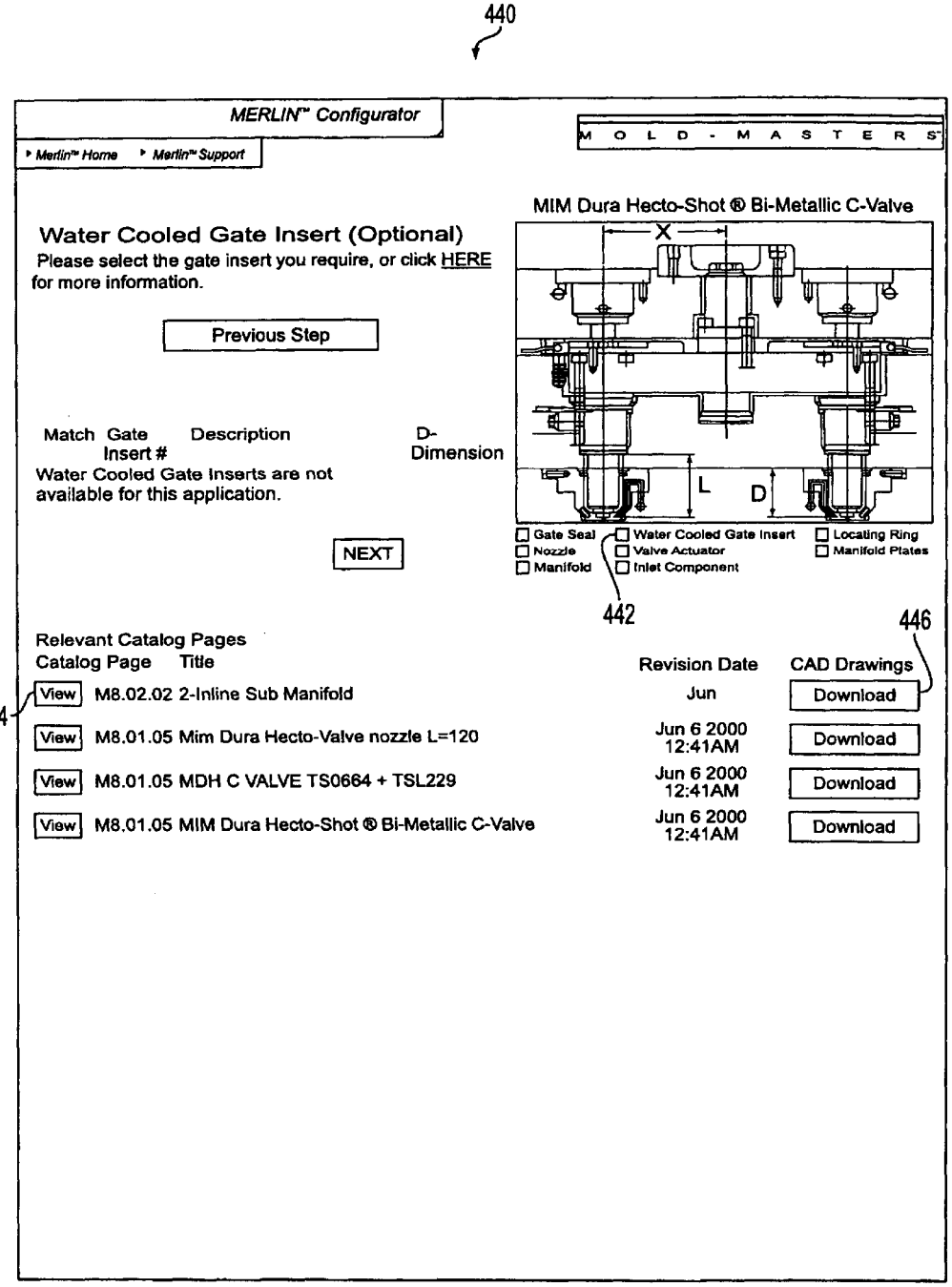
FIG. 23 is an illustration of a computer screen display of the gate insert selection process as offered by a particular embodiment of the configuring subsystem in accordance with the present invention.

FIG. 23 is an illustration of a computer screen display 440 of the gate insert selection process as offered by a particular embodiment of the configuring subsystem 12 in accordance with the present invention. The gate insert selection for example, selecting a water cooled gate insert 442 is the next sequential step a customer is guided through to configure an injection molding system. The customer can either choose a gate insert that the configuring subsystem 12 returns after doing some analysis, or the customer can specify a gate insert of their own dimensions. If the customer chooses to select a recommended gate insert, then they can view the different options using a graphical selection input, such as graphical selection input 444, that represents electronic versions of the catalog with representative information about the gate insert. In addition, the customer can access CAD drawings for the corresponding gate insert using the graphical selection input 446.

Figure 24:
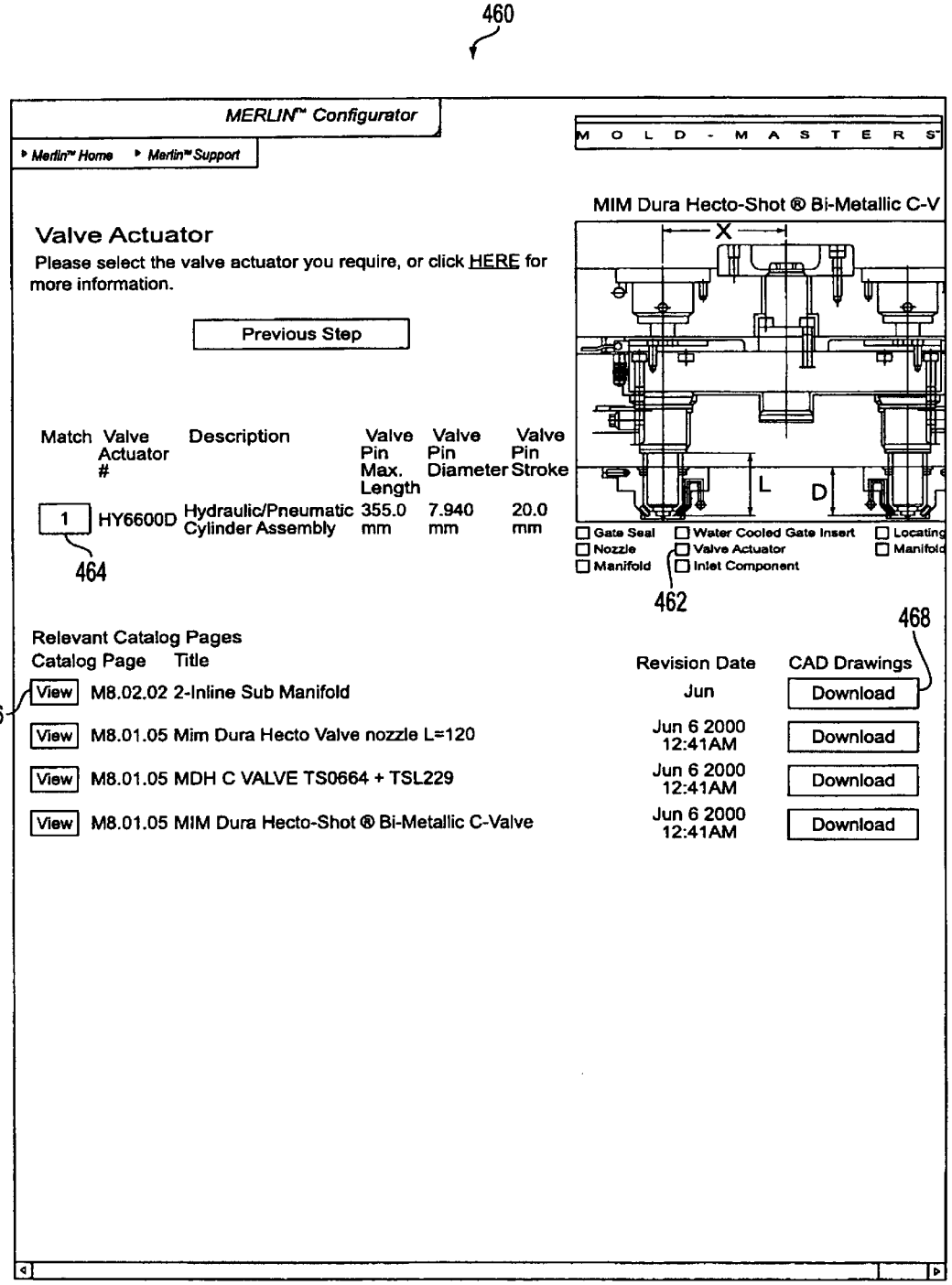
FIG. 24 is an illustration of a computer screen display of the value actuator selection process as offered by a particular embodiment of the configuring subsystem in accordance with the present invention.

FIG. 24 is an illustration of a computer screen display 460 of the value actuator selection process as offered by a particular embodiment of the configuring subsystem 12 in accordance with the present invention. The customer is guided to specify a value actuator 462 using either a recommended valve actuator provided by the configuring subsystem 12 or allowing the customer to specify the dimension of the valve actuator. If the customer choses to use the valve actuator as recommended by the configuring subsystem 12, she can access the recommendation by clicking on the graphical selection input 464 that provides relevant information regarding the dimensions and the functionality of the valve. Further, the customer can review electronic catalog pages of the recommended actuator using the "view" graphical selection input 464. The customer can also access the corresponding CAD drawing using the graphical selection input 468.

Figure 25:
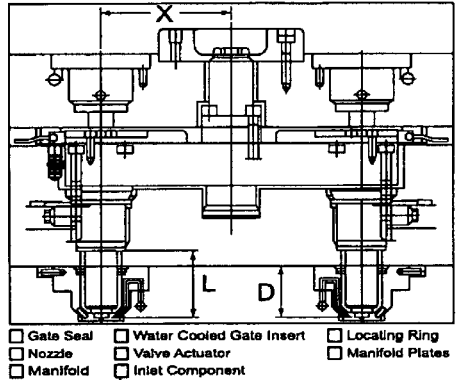
FIG. 25 is an illustration of a computer screen display of the inlet component selection process as offered by a particular embodiment of the configuring subsystem in accordance with the present invention.

FIG. 25 is an illustration of a computer screen display 480 of the inlet component selection process as offered by a particular embodiment of the configuring subsystem 12 in accordance with the present invention. The definition of the inlet component 482 is the next sequential step that the configuring subsystem 12 provides to a customer in order for her to configure a custom injection molding system. The configuring subsystem 12 provides a recommended inlet component such as, for example, the manifold center heater as displayed under match one in graphical selection input 484. If the customer selects a recommended inlet component, she can view the electronic version of the catalog which provides more information about the inlet component by clicking on the view graphical selection input 486. CAD drawing can be downloaded and viewed using the graphical selection input 488.

Figure 26:
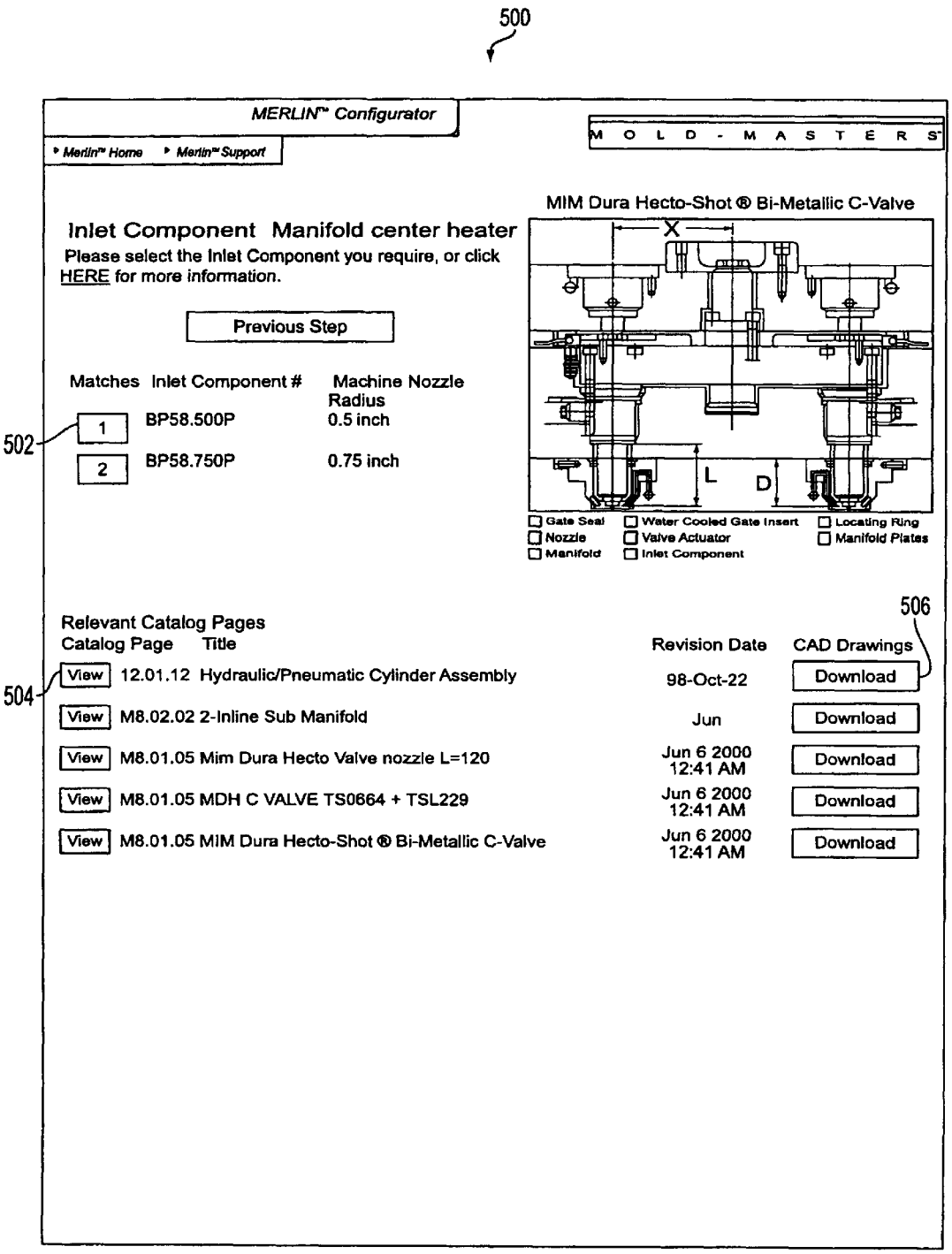
FIG. 26 is an illustration of a computer screen display of the inlet component manifold center heater selection process as offered by a particular embodiment of the configuring subsystem in accordance with the present invention.

FIG. 26 is an illustration of a computer screen display 500 of the inlet component manifold center heater selection process as offered by a particular embodiment of the configuring subsystem 12 in accordance with the present invention. The configuring subsystem guides the selection of additional inlet components for the system being specified by the customer such as, the inlet component manifold center heater. As described hereinbefore, the configuring subsystem 12 allows the customer to either use a recommended inlet component manifold center heater or specify the customer's own parameters. The recommendation provided by the configuring subsystem 12 can be viewed using the graphical selection input such as, for example, graphical selection input 502 which provides dimensions of the heater. Relevant catalog pages can be electronically accessed using the "view" graphical selection input 504 for each of the recommended inlet components. CAD drawing can be downloaded for the corresponding recommended components using the graphical selection input 506.

FIG. 27 is an illustration of a computer screen display 520 of the location ring selection process as offered by a particular embodiment of the configuring subsystem 12 in accordance with the present invention. The selection for the locating ring 522 is the next sequential step that the configuring subsystem guides a customer through in completing the definition of their injection molding system. The configuring subsystem 12 returns viable matches for the locating ring option such as, option 1 as shown in the graphical selection input 524. Relevant catalog pages such as a page that can be viewed by clicking on graphical selection input view 526 provides information from an electronic version of a catalog for each of the locating rings and components selected upto now. In addition, the CAD drawing corresponding to the locating ring can be accessed and downloaded using the graphical selection input download 528.

Figure 28:
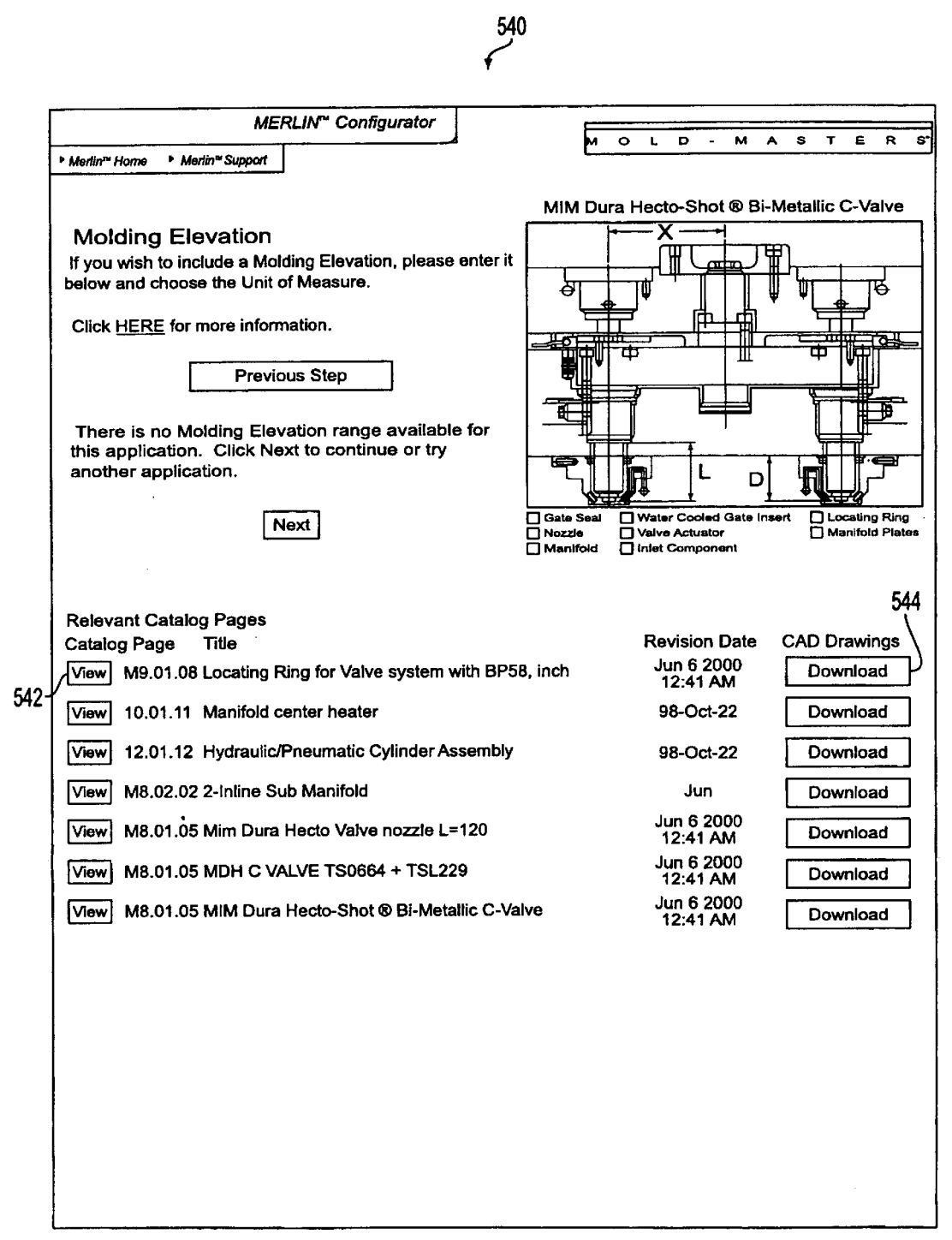

FIG. 28 is an illustration of a computer screen display 540 of the molding elevation selection process as offered by a particular embodiment of the configuring subsystem 12 in accordance with the present invention. A customer is queried as to the inclusion of a molding elevation. If the customer chooses to add information regarding molding elevation, he can enter the dimension into the configuring subsystem 12. The relevant catalog pages can be viewed by clicking on "view" graphical selection input 542 which provides electronic versions of the system components that comprise the system that has been configured by the customer. Corresponding CAD drawings for each of the component can be downloaded using the download graphical selection input 544.

Figure 29:
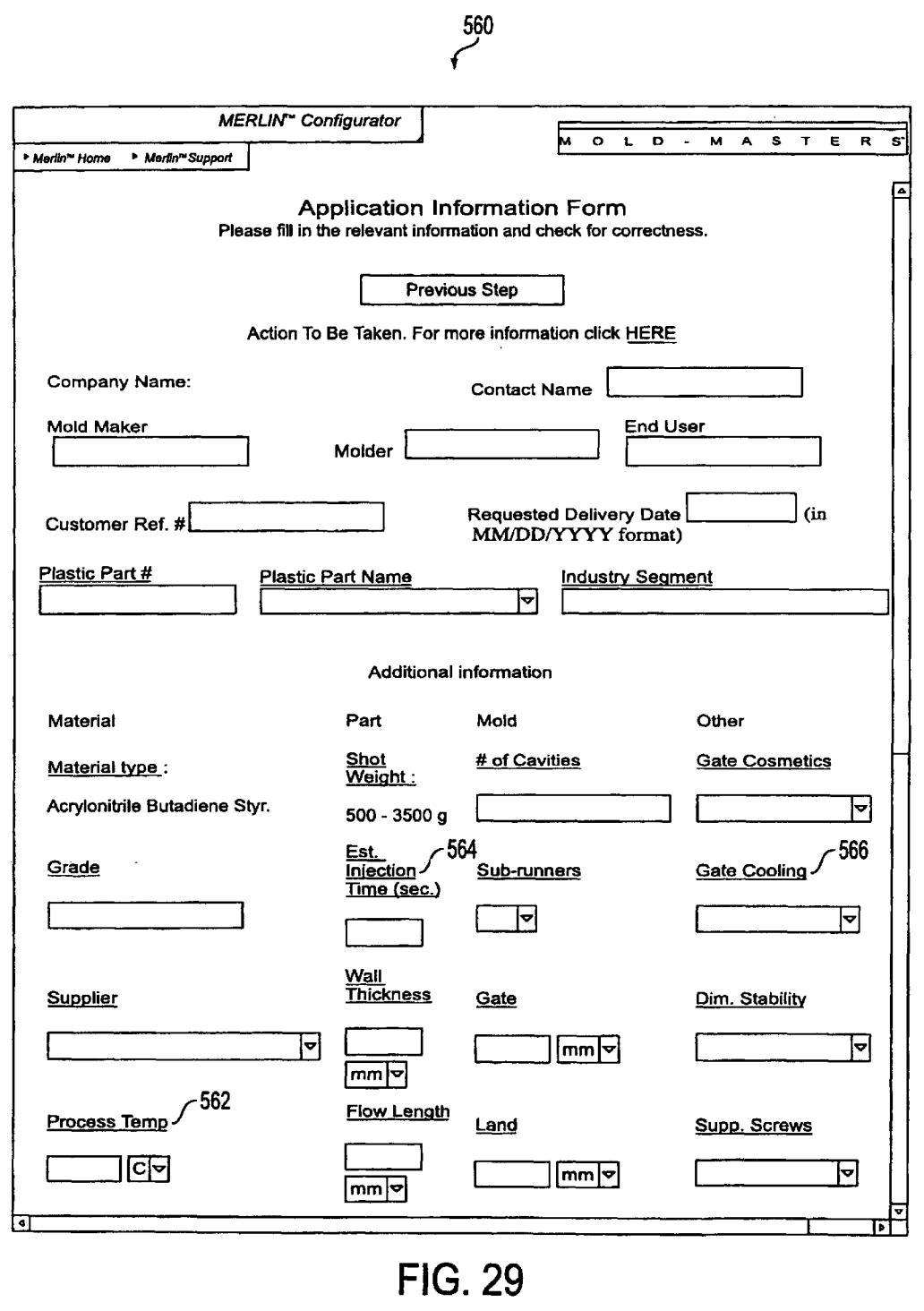

FIG. 29 is an illustration of a computer screen display 560 of the customer information form as offered by a particular embodiment of the configuring subsystem 12 in accordance with the present invention. Once the customer has defined and configured his system as described with respect to the previous figures, the configuring process is followed by an information gathering process such as, for example, the application form being completed by the customer. The customer is prompted to fill out their name, address and reference number. The customer reference number is any number the customer wants to assign to itself. In addition, there are pull-down menus that support additional information that is gathered such as, process temperature 562, injection time 564, and gate cooling 566.

FIG. 30 is an illustration of a computer screen display 580 of the summary information form as offered by a particular embodiment of the configuring subsystem 12 in accordance with the present invention. The summary information form uses the information that has been inputted into the application information form as discussed with respect to FIG. 29 and provides verification to check the correctness of the inputted customer information. The summary information form provides different options to the customer for example, the customer is prompted to save the configured system using the "save" graphical selection input 582. Another option is to receive a quote for the configured system in terms of cost as provided using the "quote" graphical selection input 584. In addition, the customer is offered an option to have the configured system viewed by an application engineer by looking at an electronic file of the configured system, who ensures that the configured system is functionally sound and would not cause any safety or reliability concerns. The customer simply has to click the review graphical selection input 586 for an application engineer to get access to an electronic version of the configured system created by the configuring subsystem 12. In addition, the customer can place an order for the configured system simply by clicking on the graphical selection input "order" 588. Drawings for the customer showing the configured system can be generated and provided simply by clicking on the "generate drawing" graphical selection input 590. Towards the latter part of screen 580, a schematic of the configured system is displayed from the electronic version of the manufacturer catalog along with the summary information that was inputted as described with respect to the FIG. 29.

FIG. 31 is an illustration of a computer screen display 600 of the list of generated drawings offered by a particular embodiment of the configuring subsystem 12 in accordance with the present invention. If the customer has requested generated drawings for the configured system, a screen of generated drawing 600 is provided to the customer for either downloading or viewing online. The drawings come in several formats, such as, but not limited to, .tif format, .dxf format, .igs format, and .wrl format. The .wrl format provides a three dimensional virtual reality model of the configured system. Each of the figures for the respective formats either has a download option such as, by clicking graphical selection input 602 or a viewing option such as, by clicking viewing graphical selection input 604.

Figure 32:
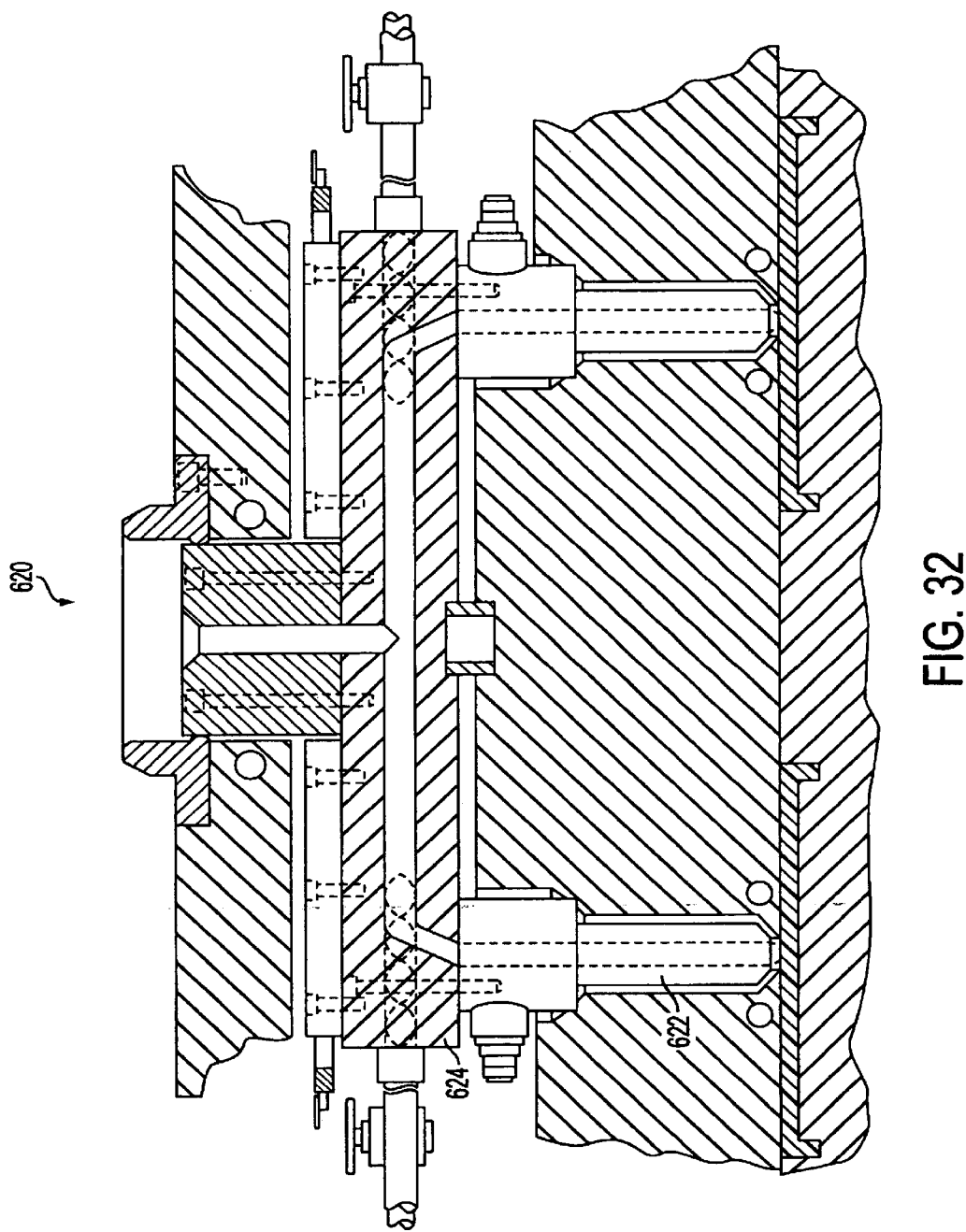
FIG. 32 is a sectional view of a multi-cavity injection molding system having a manifold as defined using a particular embodiment of the configuring subsystem in accordance with the present invention.

FIG. 32 is a sectional view of an illustrative multi-cavity injection molding system 620 having a manifold as defined using the configuring subsystem 12 in accordance with one particular embodiment of the present invention. The injection molding system 620 is described in a U.S. Pat. No. 5,007,821, which issued on Apr. 16, 1991 and is incorporated herein by reference. FIG. 32 is a representative drawing that a customer can access using the generated drawing option as discussed with respective FIG. 30. The multi-cavity injection molding system 620 has a number of heated nozzles 622 extending from a common heated manifold 624 as defined by the customer during the process of configuring the system as described with respect to FIG. 3 through FIG. 31.

Figure 33:
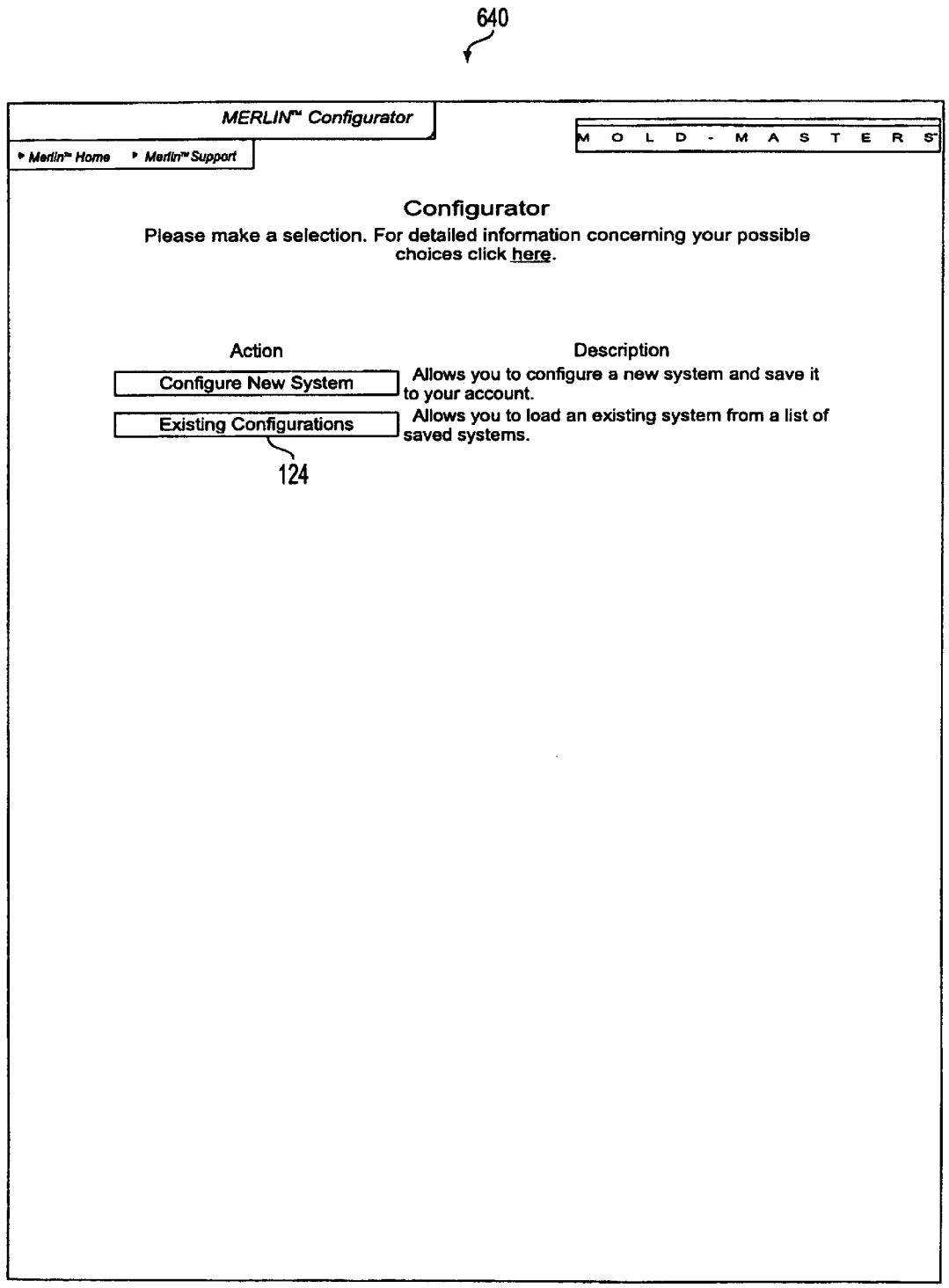
FIG. 33 is an illustration of a computer screen display of the configuring options selecting the existing configurations option as offered by a particular embodiment of the configuring subsystem in accordance with the present invention.

FIG. 33 is an illustration of a computer screen display 640 of the configuring options selecting the "existing configurations" option 124 as offered by a particular embodiment of the configuring subsystem 12 in accordance with the present invention. As discussed with respect to FIG. 5, the configuring subsystem 12 offers an option to access and view existing configurations from a list of saved systems. Once the customer has created a configured system, she can at a later time logon per the process described with respect to FIG. 3 and access the configuring option 124.

FIG. 34 is an illustration of a computer screen display 660 of the existing configurations as offered by a particular embodiment of the configuring subsystem 12 in accordance with the present invention. The existing configuration screen display 660 accesses the existing configured system, such as the configuration "previous config" 662, as created with respect to FIG. 3 through FIG. 32. The customer can go in and check the status 664 and reference a quote number 666. The customer can also manipulate the existing configuration by either copying in order to create a new configured system or delete the existing configuration.

Figure 35:
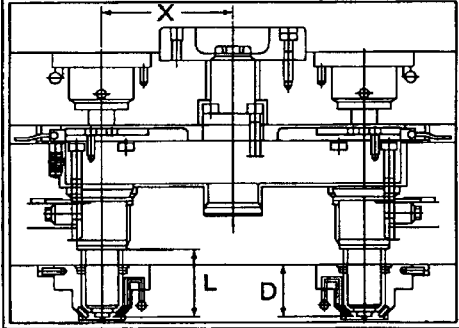
FIG. 35 is an illustration of a computer screen display of the summary information form as offered as a result of existing configurations option in accordance with one particular embodiment of the present invention.

FIG. 35 is an illustration of a computer screen display 680 of the summary information form as offered as a result of existing configurations option 124 in accordance with one particular embodiment of the present invention. Once the existing configuration has been selected using the previous screen 660 described with respect to FIG. 34, a summary information screen display 680 can be used by the customer to verify the information previously inputted and then take additional action in terms of either saving the configured system using the graphical selection input 682, getting a quote at this time for the configured system using the "quote" graphical selection input 684 or having the system previously configured be reviewed by application engineers by clicking on the "review" graphical selection input 686. The customer can at this point also just order the previously configured system using a graphical selection input 688. In addition, the customer can at this time request generated drawings displaying the configured system using the graphical selection input 670.

It should be noted that even though the methods discussed with respect to the FIGS. 3 through 35 have been presented as a sequential flow of configuring and ordering a system, the methods may include the user breaking the sequence by accessing previous screen displays or options to exit from each definition stage. The method and apparatus of the present invention is implemented without the need of any communication or human intervention between a purchasing party, such as the customer, and the personnel of the manufacturing party other than the communications provided by the computer-implemented system of the present invention. The method and apparatus of the present invention results in reductions to the cost and shortening of the schedule to design, configure, order and manufacture an injection molding system.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

Additionally, the system architecture depicted and described with respect to FIGS. 1, 2*a* and 2*b* has been chosen to best illustrate the overall functionality of the claimed invention. Splitting the functionality into a configuring subsystem, a business subsystem, a processing subsystem and a drawing subsystem was done for ease of discussion. Physically, these subsystems do not have to be separate and distinct subsystems with the functionalities assigned to each as described herein. It will be apparent to a person of ordinary skill in the relevant art how to implement alternative physical architectures comprising fewer or more subsystems which together perform the functionality described herein.

It will be apparent to those of ordinary skill in the art that methods involved in the automated injection molding configuring and manufacturing systems may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

Figure 36:
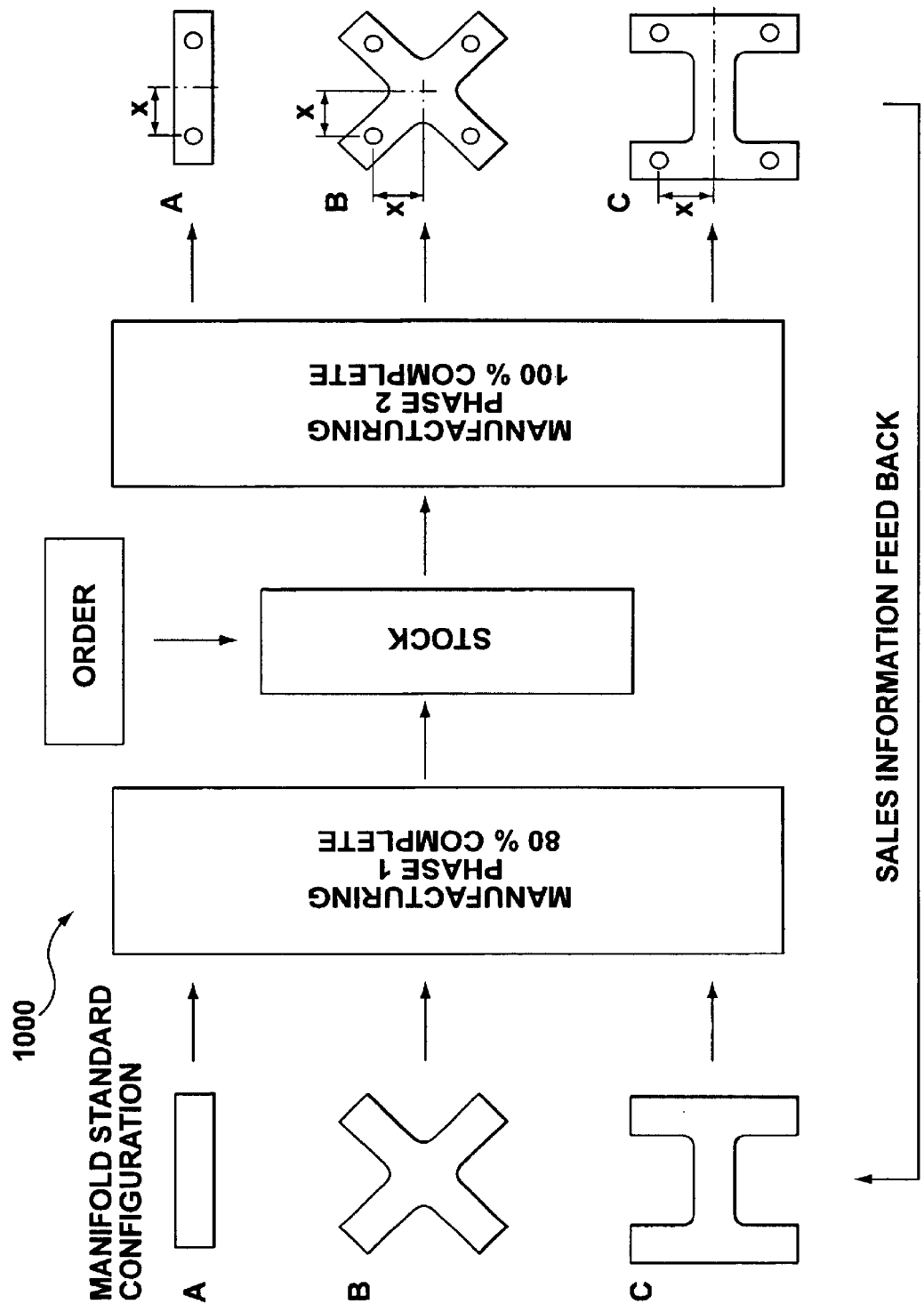
FIG. 36 is a block diagram illustrating a preferred method of the present invention for manufacturing and assembling a hot runner system.

FIG. 36 illustrates a block diagram for a preferred method 1000 of the present invention for high-speed assembling and manufacturing of customized hot runner systems. As shown in FIG. 36, the method 1000 preferably starts out with approximately 80% of the manufacturing and assembling of the hot runner systems and the standard manifolds A, B, C being completed in a first phase, referred to herein as Phase 1 (see below). A customer may then place an order for the stocked, 80% complete hot runner systems and choose between manifold A, B, and/or C. After an order has been taken, the necessary manifold(s) and components are removed from stock, and 100% of the manufacturing and assembling of the hot runner systems is completed in a second phase, referred to herein as Phase 2 (see below). The hot runner systems are completed based on the factors specified in the customer's order, such as the nozzle pitches, X.

Figure 37:
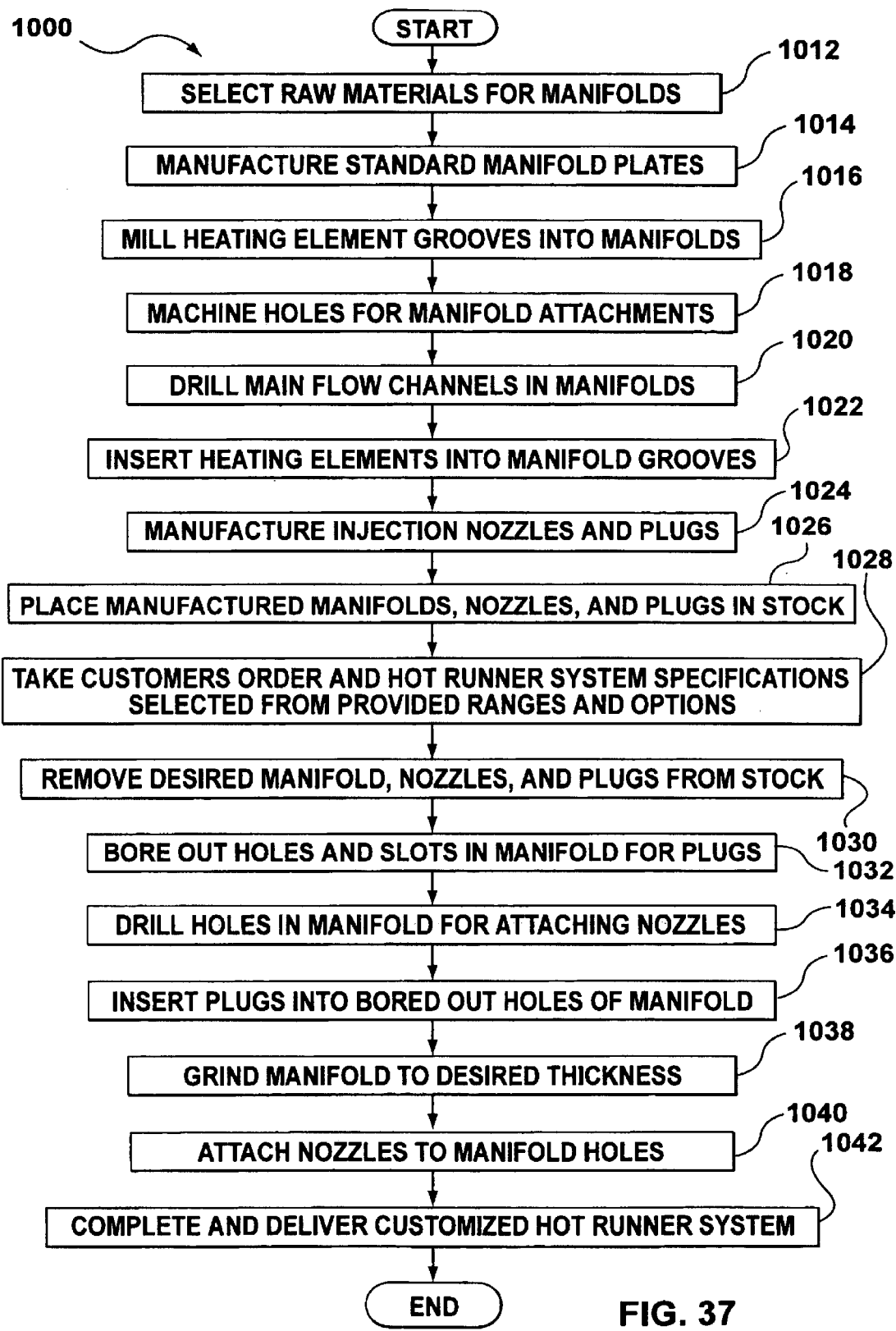
FIG. 37 is a flow diagram illustrating a preferred method of the present invention for manufacturing and assembling a hot runner system.

FIG. 37 shows a flow diagram illustrating the preferred method 1000 of the present invention in more detail. As shown in FIG. 37, the method 1000 begins with Step 1012 wherein raw material is selected for a plurality of different manifold plates. In Step 1014, a variety of different standard manifold plates are manufactured by cutting and grinding the selected raw material into various standard manifold plate shapes, configurations, and dimensions. In one exemplary embodiment of the method of the present invention, the selected raw material is steel that is manufactured into one of a straight bar shape, X-shape, H-shape, Y-shape, Y-plate shape, or H-plate shape. In this exemplary method, each manifold plate may also be configured with a wide range of thickness, preferably from about 30 millimeters to about 37 millimeters, and the flow channels of the manifold plates may be configured with a wide range of diameters, preferably from about 3 millimeters to about 12 millimeters. For more information on the various shapes, configurations, sizes, and styles of the manifold plates suitable for use with the present invention, see U.S. Pat. No. 4,761,343, U.S. Pat. No. 5,007,821, U.S. Pat. No. 5,030,084, U.S. Pat. No. 5,441,197, U.S. Pat. No. 5,705,202, and U.S. Pat. No. 5,792,493, all of which are specifically incorporated in their entirety herein by reference.

As shown in FIG. 37, the next Step in the method 1000 of the present invention is Step 1016, wherein heating element grooves are milled into the manifold plates. In Step 1018, holes for any manifold attachments, such as melt inlet couplings, heating components, and/or manifold locators, connectors, and alignment pins, are then machined into the manifold plates. Next, the main flow channels are drilled (e.g., gun drilled) in the manifold plates in Step 1020. As previously mentioned, the diameters of the main flow channels are preferably in the range from 3 millimeters to 12 millimeters.

In Step 1022, heating elements are inserted and installed into the heating element grooves that were previously milled into the manifold plates. Any number of known methods may be used to manufacture and install such heating elements, including, but not limited to, brazing, press-in, plasma spray, and the like. For more information on suitable methods for manufacturing and installing the heating elements for the present invention, see U.S. Pat. No. 3,095,604, U.S. Pat. No. 4,381,685, U.S. Pat. No. 5,496,168, U.S. Pat. No. 4,439,915, U.S. Pat. No. 4,638,546, U.S. Pat. No. 4,688,622, WIPO Publication No. 99/20451, European Patent No. 425,981, and European Patent No. 262,490, all of which are specifically incorporated in their entirety herein by reference.

The injection nozzles and plugs to be used with the manifold plates are manufactured in Step 1024. Any of the injection nozzles disclosed and described in the above incorporated patents may also be used with the method of the present invention. Preferably, the injection nozzles may have a standard length from 36 millimeters to 380 millimeters, a flow channel diameter from 3 millimeters to 12 millimeters, a shot weight range from 0.1 grams to 1500 grams, a variety of different nozzle tip styles, and may also be either thermal-gated or valve-gated. In one exemplary embodiment of the method of the present invention, each injection nozzle may also manufactured to be adaptive for several different gate sizes in accordance with U.S. Pat. No. 4,579,520, which is specifically incorporated in its entirety herein by reference. Using an adaptive injection nozzle with the method of the present invention further standardizes the injection nozzles, and reduces manufacturing and inventory costs, since fewer nozzles can cover more sizes.

An array of different plugs, with varying diameters and lengths, may be used in the method of the present invention. For instance, the plugs may be designed to be inserted into, and oriented within, the bored holes of the manifold plates perpendicular and/or parallel to the main flow channels in the manifold plates. For more information on plugs suitable for use with the present invention, see U.S. Pat. No. 5,762,976, U.S. Pat. No. 6,007,108, U.S. Pat. No. 5,441,197, U.S. Pat. No. 5,366,369, and European Patent No. 875,355, all of which are incorporated in their entirety herein by reference. In addition to plugs, it should be understood that connector bushings may also be used with the method of the present invention. If connector bushings are manufactured and used with the present invention, however, then preferably nozzle manifolds are also manufactured and used together With the connector bushings for the method of the present invention. For more information on connector bushings and manifold nozzles, see U.S. Pat. No. 5,792,493, which is specifically incorporated in its entirety herein by reference.

As shown in FIG. 37, the method 1000 of the present invention continues with Step 1026, wherein the manufactured manifold plates, nozzles, plugs, and other hot runner components (e.g., connector bushings and nozzle manifolds) are stored and placed in stock. Preferably, a selection of different manifold plates, nozzles, plugs, and other hot runner components are manufactured and stocked in order to give a customer a variety of options for manifold shapes, lengths, and thickness, nozzle types, sizes, and gate configurations, plug diameters and lengths, and combinations thereof. For purposes of the present application, Steps 1012 through 1026 of the method 1000 will be collectively referred to herein as Phase 1. It should be understood, however, that more or fewer Steps may be included in Phase 1, and the method 1000 of the present invention should not be limited to only the Steps of Phase 1 shown in FIG. 37 and described herein. In addition, it should also be understood that the particular order of the Steps in Phase 1 is not necessarily critical, and may be rearranged, depending on manufacturing preferences. Furthermore, it should be understood that Phase 1 may be performed in a continuous loop nature to keep the stocked inventory at a full level.

The method 10 of the present invention continues with Step 1028, as shown in FIG. 37.

In Step 1028, the hot runner maker takes a customer order for a hot runner system, including the hot runner system's specifications selected from the provided ranges and options corresponding to the manifold plates, nozzles, plugs, and other hot runner components in stock. For example, a customer may specify a manifold plate with any standard length between 150 millimeters and 600 millimeters, any standard thickness from 25 millimeters to 40 millimeters, and any standard flow channel diameters from 3 millimeters to 12 millimeters. The customer may also specify a straight bar shape, X-shape, H-shape, Y-shape, Y-plate shape, or H-plate shape manifold plate, as well as the number of nozzles (e.g., 2 to 8) and the nozzle pitch (e.g., 30 millimeters to 250 millimeters). Finally, the customer may also specify the shapes, sizes, tip styles, gate configurations and shot weight ranges of the injection nozzles, depending on what nozzles have been manufactured and placed in stock.

In Step 1030, the manifold plate, nozzles, and plugs corresponding to the customer's order and specifications are removed from stock. The method 1000 proceeds with Step 1032, wherein the necessary holes and slots for the plugs are bored out in the manifold plate at the locations set by the customer's order and hot runner system specifications. For example, if a customer specified a nozzle pitch range of 100 millimeters, the holes and slots for the plugs would be bored out 100 millimeters laterally from the melt inlet. As shown in FIG. 37, the holes for attaching the selected nozzles are then drilled in the manifold plate around the bored out holes and slots for the plugs in Step 1034.

Next, in Step 1036, the selected plugs are inserted and shrunk-fit into the bored out holes of the manifold plate, with the alignment pins of the plugs being positioned in the alignment slots. To the extent necessary, the manifold plate is then ground to its desired thickness in Step 1038. For instance, if a customer specified a 30 millimeter thick manifold plate, and a 35 millimeter thick manifold plate was removed from stock in connection with the customer's order, the 35 millimeter thick stocked manifold plate would be ground to the desired 30 millimeter thick manifold plate.

The method 1000 continues with Step 1040, wherein the selected injection nozzles are attached to the drilled out holes in the manifold plate surrounding the plugs. The injection nozzles are attached to the manifold plate in a manner such that the melt channel of the nozzles is aligned and in communication with the melt passage of the plugs, which in turn is aligned and in communication with the main flow channel. Any other desired finishing to complete the hot runner system is done in Step 1042, and the customized hot runner system is then ready for delivery to the customer.

For purposes of the present application, Steps 1028 through 1040 of the method 1000 will be collectively referred to herein as Phase 2. It should be understood, however, that more or fewer steps may be included in Phase 2, and the method 1000 of the present invention should not be limited to only the steps of Phase 2 shown in FIG. 37 and described herein. In addition, it should also be understood that the particular order of the steps in Phase 2 is not necessarily critical, and may be rearranged, depending on manufacturing preferences.

FIGS. 38A–38J illustrate an exemplary embodiment of the method 1000 of the present invention, using a straight bar shape, two nozzle hot runner system. It should be understood that hot runner systems with other shapes, configurations, and styles may be used with the method of the present invention, and the straight bar shape, two nozzle hot runner system described herein and shown in FIGS. 38A–38J was chosen for illustrative purposes only. Moreover, the sizes and dimensions set forth in detail below may be different for other hot runner systems, and different dimensions and sizes are contemplated for such other hot runner systems.

As shown in FIG. 38A, a straight bar shaped manifold plate 1100 has a first side 1102, a second side 1104 opposite the first side 1102, a first end 1106, and a second end 1108 spaced from the first end 1106. The manifold plate 1100 is preferably selected from a steel material (Step 1012), and is manufactured with a standard length, L, and a standard thickness, T (Step 1014). Preferably, the length, L, is in the range from 300 millimeters to 600 millimeters, more preferably, in the range from 322 millimeters to 572.5 millimeters, and most preferably, either 322 millimeters, 372 millimeters, 422 millimeters, 472.5 millimeters, 522.5 millimeters, or 572.5 millimeters. Similarly, the thickness, T, is preferably in the range from 25 millimeters to 40 millimeters, more preferably in the range from 30 millimeters to 37 millimeters, and most preferably 30 millimeters.

As shown in FIG. 38B, a heating element groove 1110 is milled into the first side 1102 of the manifold plate 1100 (Step 1016). A melt inlet 1112, as well as holes 1114 for receiving a melt inlet coupling (not shown) are drilled into the second side 1104 of the manifold plate 1100 (Step 1018), as shown in FIG. 38C. In addition, a main flow channel 1120 is drilled in the manifold plate 1100 (Step 1020). The main flow channel 1120 preferably has a lateral portion 1122 extending from the first end 1106 to the second end 1108 of the manifold plate 1100. The main flow channel 1120 preferably also has an inlet portion 1124 extending between, and in communication with, the melt inlet 1112 and the lateral portion 1122 of the main flow channel 1120. The diameter of the main flow channel is preferably in the range from 3 millimeters to 12 millimeters, and depends on the size of the manifold plate 1100 and the type of material being used with the hot runner system.

As shown in FIGS. 38D–38F, a heating element 1130 is inserted and installed into the heating element groove 1110 in the first side 1102 of the manifold plate 1100 (Step 1022). As discussed above, the heating element 1130 may be fixed within the heating groove 1110 via a brazing, press-fit, plasma spray, or other like method readily known in the art. The power of the heating element 1130 at 220 volts is preferably in the range from 1650 watts to 2800 watts, depending on the size of the manifold and the type of material being used with the hot runner system.

The manifold plate 1100 is now ready to be stocked. Although not shown, it should be understood that a number of standard nozzles and plugs have already been manufactured (Step 1024) and placed in stock together with the manifold plate (Step 1026). Accordingly, Phase 1 has been completed as of FIG. 38F.

Phase 2 then begins with a customer placing an order for a straight bar shaped, two nozzle hot runner system (Step 1028), and the corresponding components being removed from stock (Step 1030). As shown in FIGS. 38G–38H, a first bore 1140 and a first alignment slot 1142, as well as a second bore 1144 and a second alignment slot 1146, are then bored out of the manifold plate 1100 (Step 1032). The locations of the bores 1140, 1144 and the corresponding alignment slots 1142, 1146 depend on the nozzle pitch, X, specified by the customer's order (see Step 1028). As known in the art, the nozzle pitch, X, is generally defined as the lateral distance between the center of the melt inlet and the center of a nozzle, which is typically also the center of a plug and its corresponding bore. The below Table 1 includes preferable nozzle pitch, X, ranges for several different manifold plate lengths, L:

TABLE 1

| X | L |
|---|---|
| 100.00–125.00 | 322.0 |
| 125.01–150.00 | 372.0 |
| 150.01–175.00 | 422.0 |
| 175.01–200.00 | 472.5 |
| 200.01–225.00 | 522.5 |
| 225.01–250.00 | 572.5 |

In addition to the first and second bores 1140, 1144 and the first and second alignment slots 1142, 1146, a plurality of nozzle holes 1148 are also drilled in the manifold plate 1100 around the first and second bores 1140, 1144 (Step 1034). As shown in FIGS. 38I–38J, a first plug 1150 having a first alignment pin 1151 and a first plug channel 1152 is inserted and press fit into the first bore 1140 (Step 1036). Likewise, a second plug 1154 having a second alignment pin 1155 and a second plug channel 1156 is inserted and shrunk fit into the second bore 1144 (Step 1036). Preferably, the first and second alignment pins 1151, 1155 are positioned within the first and second alignment slots 1142, 1146, respectively. In addition, the first and second plug channels 1152, 1156 are aligned and in communication with the lateral portion 1122 of the main flow channel 1120.

Although not shown, the manifold plate may be ground to its desired thickness (Step 1038), if necessary, and the nozzles may be attached with fasteners (not shown) to the manifold plate 1100 via the nozzle holes 1148 (Step 1040). Any other finishing steps may then be performed on the customized hot runner system before it is eventually delivered to its customer (Step 1042).

Figure 38K:
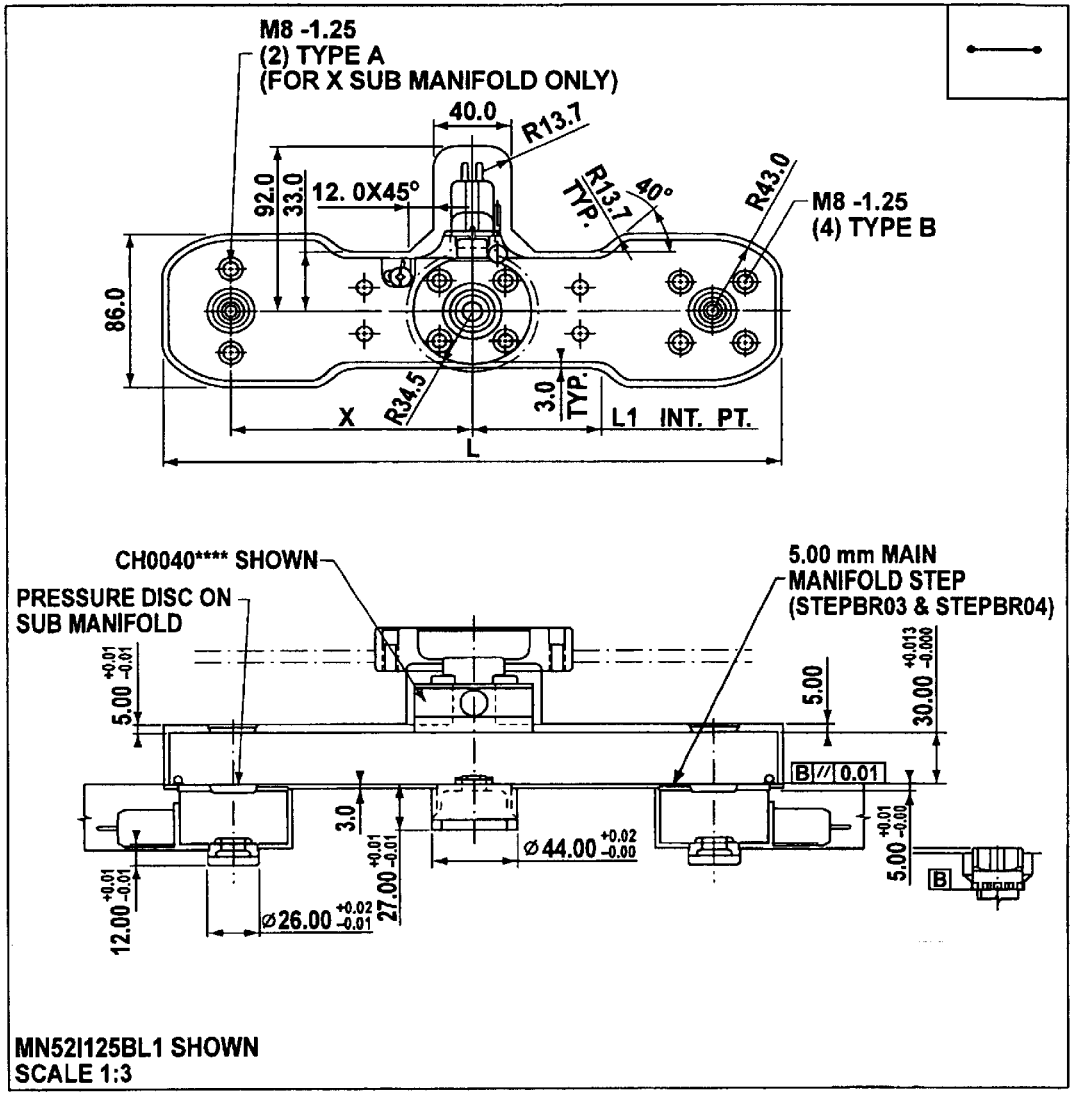
FIG. 38K-38M are detailed top and side views of the partial straight bar, two nozzle hot runner system of FIG.
Figure 38L:
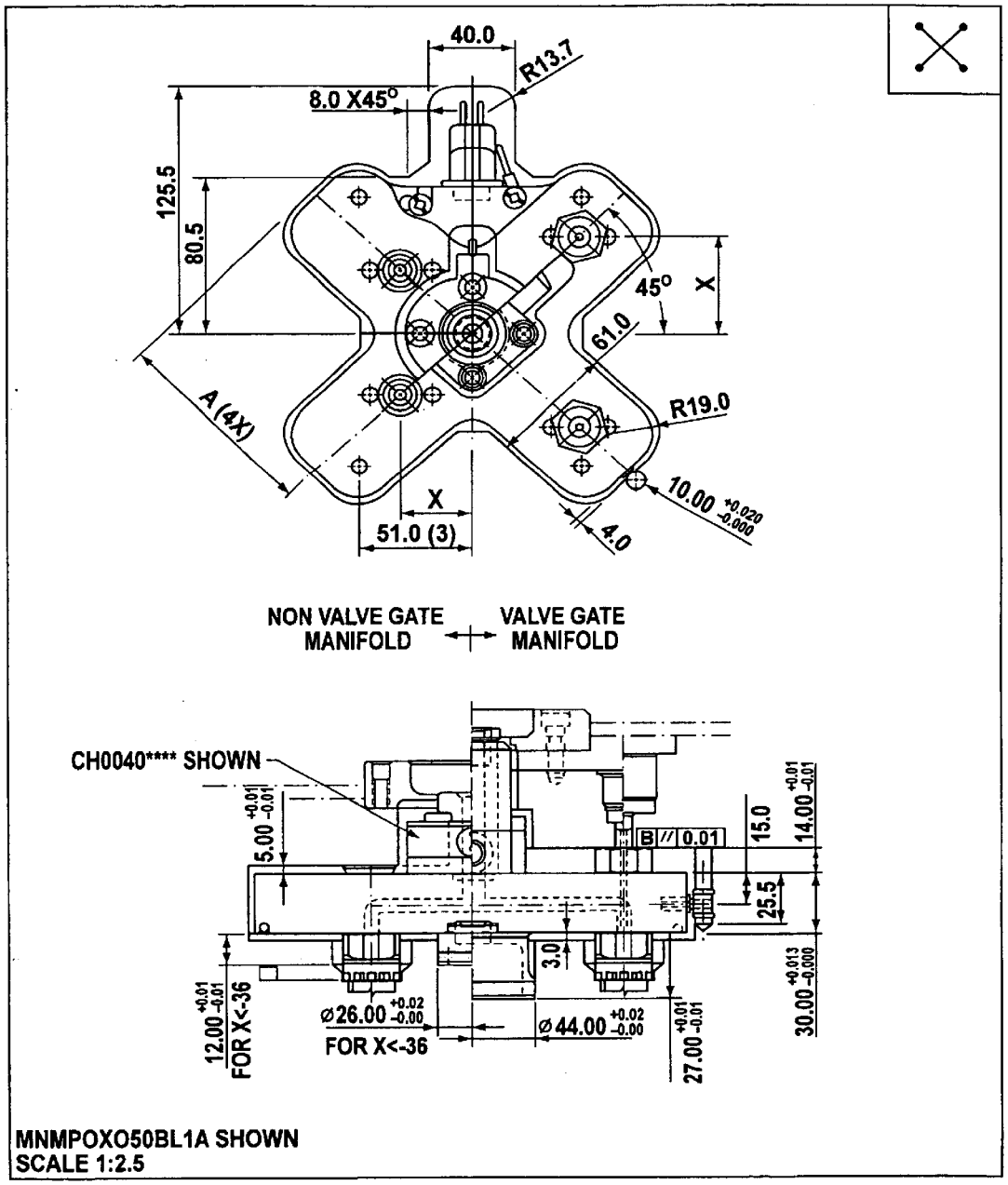
Figure 38M:
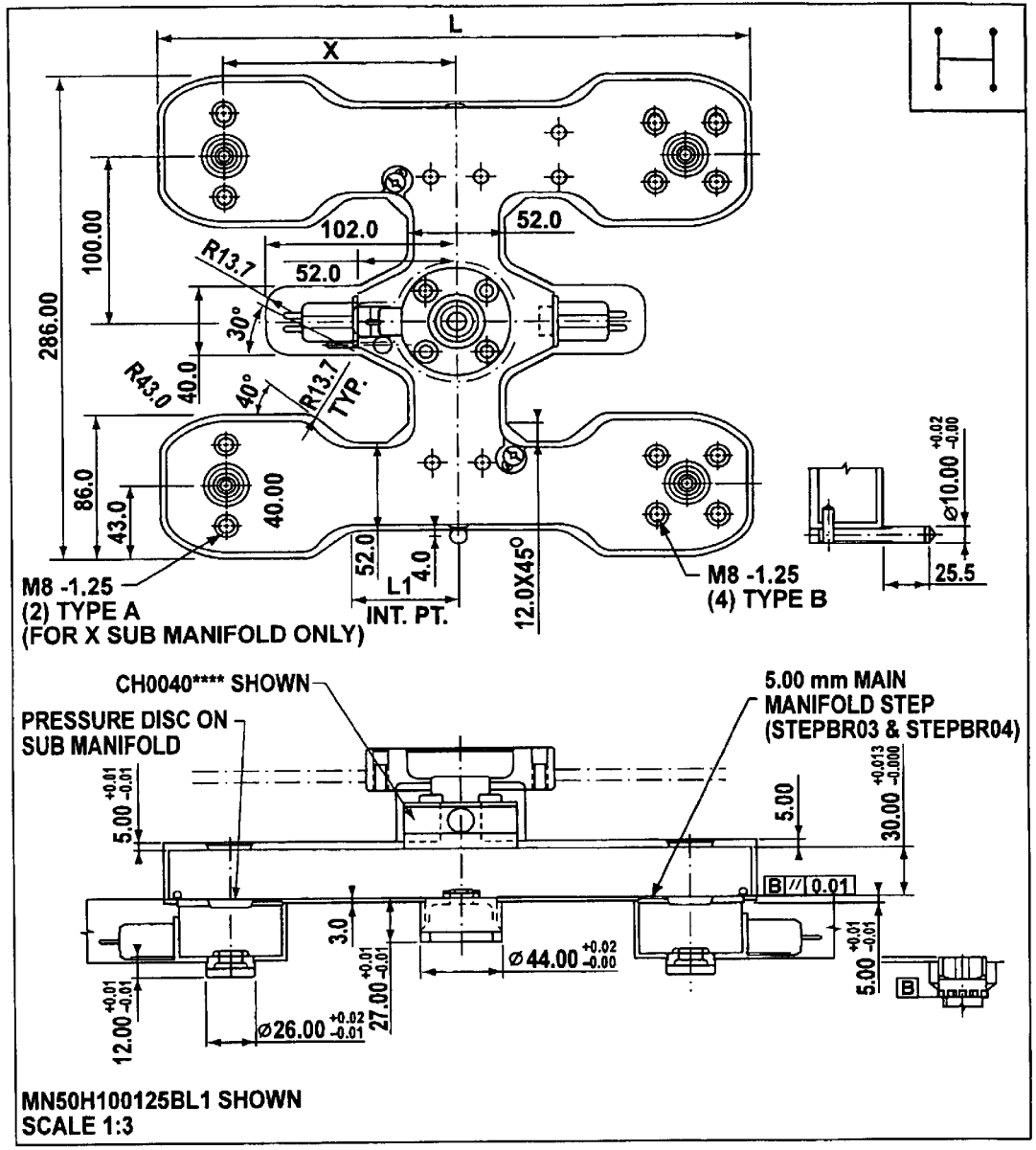

As previously mentioned, it should be understood that manifold plates other than the straight bar shaped, two nozzle type shown in FIG. 38J may be used with the method of the present invention. For instance, an X-shaped, four nozzle manifold plate or an H-shaped, four nozzle manifold plate may be used with the method of the present invention. Accordingly, a detailed example of the straight bar shaped, two nozzle manifold plate is not only shown in FIG. 38K, but detailed examples of X-shaped and H-shaped, four nozzle manifold plates are shown in FIGS. 38L–38M, respectively. Tables identifying preferred nozzle pitches and manifold dimensions (e.g., manifold length, L) for each of these manifold plate types are also included in FIGS. 38K–38M.

FIG. 39 shows the proper positioning and alignment for the first plug 1150 within the first bore 1140 of the manifold plate 1100. To avoid redundancy and unnecessary repetition, only the first plug 1150 is shown in FIG. 39, since the second plug 1154 is similarly situated and installed. As shown in FIG. 39, the first plug 1150 is preferably positioned within the first bore 1140 such that the first plug 1150 is flush and even with the manifold plate 1100, and the first plug channel 1152 is aligned and in communication with the lateral portion 1122 of the main flow channel 1120. The first plug 1150 is also positioned within the first bore 1140 of the manifold 1100 such that the first plug channel 1152 is aligned and in communication with a central melt passage 1165 of a nozzle 1160, as shown in FIG. 39.

As shown in FIG. 40, the first plug 1150 may alternatively be rotated 90° and positioned parallel to the lateral portion 1122 of the main flow channel 1120, rather than perpendicularly, as shown in FIG. 39. For ease of reference, this rotated first plug will be referred to herein by the reference numeral 1150'. FIG. 41 illustrates the proper positioning of the first plug 1150' within the manifold plate 1100. In this arrangement, the first bore 1140 and the first alignment slot 1142 are rotated 90° to a modified first bore 1140' and a first alignment slot 1142'. As shown in FIG. 41, the first plug 1150' is inserted into the manifold plate 1100 parallel with the lateral portion 1122 of the main flow channel 1120 such that the first plug channel 1152 is aligned in the communication with the lateral portion 1122 of the main flow channel 1120, as well as an auxiliary flow channel 1170 that is aligned and in communication with a central melt channel 1165 of a nozzle 1160. Any auxiliary flow channel 1170 is preferably drilled at the same time that the modified first bore 1140' and the first alignment slot 1142' are bored out of the manifold plate 1100.

The method of the present invention may be applied with particular advantage to situations where a customized hot runner system needs to be quickly manufactured and assembled for a customer. By conducting most of the manufacturing and assembling for the hot runner system prior to a customer placing an order, the amount of manufacturing and assembling that needs to be done after a customer places an order for a hot runner system is minimized, thereby dramatically decreasing the amount of time required to fulfill a customer's order for a hot runner system. Moreover, by manufacturing, assembling, and stocking only standard manifold plates, injection nozzles, and plugs that can readily be customized to fit a customer's order, inventory costs can also be minimized.

It should also be readily apparent from the forgoing description and accompanying drawings that method of the present invention is an improvement over the prior art methods for manufacturing and assembling hot runner systems. For instance, the method of the present invention uses a variety of standard stock manifold plates, nozzles, and plugs for high-speed manufacturing and assembling of hot runner systems, while still providing customers with numerous options and tremendous flexibility for ordering and customizing their hot runner systems. In addition, unlike prior art methods, a multitude of customers can simultaneously receive fast manufacturing and assembling of their customized hot runner systems with the method of the present invention. In other words, with the method of the present invention, customer orders do not have to be put on hold or delayed to accommodate more pressing rush orders.

The method of the present invention is well suited for use with an online ordering system, such as an Internet-based hot runner configuration system. The assignee of the present invention operates such a system, named Merlin™, which is suitable for use with the method of the present invention. For more information on Merlin™, see the URL "www.moldmasters.com" and the commonly assigned U.S. patent application Ser. No. 09/595,154, filed Jun. 16, 2000, entitled "Method and Apparatus for an Automated Injection Molding Configuring and Manufacturing System," and specifically incorporated by reference herein in its entirety.

Those skilled in the art to which the invention pertains may make modifications and other embodiments employing the principles of this invention without departing from its spirit or essential characteristics, particularly upon considering the foregoing teachings. Accordingly, the described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A computer implemented system connected to a computer network and accessible by a plurality of users for specifying, orderings, and manufacturing injection molding systems, comprising in combination:

a configuring subsystem that uses one or more customer defined parameters to generate a customized injection molding system which implements the customer defined parameters;

a processing subsystem in communication with the configuring subsystem that processes the customized injection molding system generated by the configuring subsystem to provide drawings of the customized injection molding system;

a business subsystem in communication with the configuring subsystem that calculates a cost for manufacturing the customized injection molding system and that determines a schedule for completing the customized injection molding system; and a manufacturing subsystem in communication with the configuring subsystem that provides input for manufacturing the customized injection molding system generated by the configuring subsystem;

wherein the customized injection molding system is created by assembling a plurality of components, the components including at least a manifold plate that was partially manufactured and placed in inventory before the configuring subsystem received any customer defined parameters for the customized injection molding system, the manufacture of the manifold plate being completed after the configuring subsystem receives the customer defined parameters for the customized injection molding system.

2. The computer implemented system of claim 1, wherein the partially manufactured manifold plate is a unitary manifold plate.

3. The computer implemented system of claim 1, wherein the customer defined parameters comprise at least one of nozzle types, nozzle pitches, manifold shapes, manifold lengths, or manifold thickness.

4. The computer implemented system of claim 1, wherein the processing subsystem further provides a bill of materials for the customized injection molding system.

5. The computer implemented system of claim 1, wherein the configuring subsystem is in communication with a web page server and the computer network.

6. The computer implemented system of claim 5, wherein the computer network is the Internet.

7. The computer implemented system of claim 5, wherein the computer network is an Intranet.

8. The computer implemented system of claim 1, wherein the configuring subsystem provides for verification of the customized injection molding system in terms of at least one of functionality and safety.

9. In a computer network-based system, an automated method for specifying, ordering, and manufacturing hot runner systems, comprising:

partially manufacturing a plurality of manifold plates, for forming portions of hot runner systems in a first phase;

placing the partially manufactured manifold plates in inventory;

after placing the partially manufactured manifold plates in inventory, receiving one or more customer defined parameters;

using the one or more customer defined parameters in a configuration subsystem to generate a customized hot runner system;

submitting the customized hot runner system for processing to a processing subsystem;

after generating the customized hot runner system, removing one of the partially manufactured manifold plates from inventory;

further manufacturing the partially manufactured manifold plate in accordance with the customer defined parameters in a second phase; and assembling the further manufactured manifold plate with other hot runner components to create customized hot runner system.

10. The method of claim 9, further including creating drawings for the customized hot runner system via the processing subsystem.

11. The method of claim 9, further including creating a bill of materials for the customized hot runner system via the processing subsystem.

12. The method of claim 9, further including determining manufacturing parameters based on the customized hot runner system.

13. The method of claim 9 wherein the partially manufactured manifold plates are unitary manifold plates.

14. The method of claim 9 wherein the manifold plates have predefined shapes for hot runner systems, and a completed manifold plate has substantially the same shape as the predefined shape of the partially manufactured manifold plate.

15. The method of claim 9 wherein the manifold plates are partially manufactured by drilling into each manifold plate a common melt inlet and one or more flow channels in communication with the melt inlet, the melt inlet being substantially perpendicular to the flow channels.

16. The method of claim 9 wherein the other hot runner components comprise one or more of the following: plugs, nozzles, and/or heaters.

* * * * *